(12) United States Patent
Abdelilah et al.

(10) Patent No.: US 6,661,837 B1
(45) Date of Patent: Dec. 9, 2003

(54) MODEMS, METHODS, AND COMPUTER PROGRAM PRODUCTS FOR SELECTING AN OPTIMUM DATA RATE USING ERROR SIGNALS REPRESENTING THE DIFFERENCE BETWEEN THE OUTPUT OF AN EQUALIZER AND THE OUTPUT OF A SLICER OR DETECTOR

(75) Inventors: Youssef Abdelilah, Holly Springs, NC (US); Gordon Taylor Davis, Chapel Hill, NC (US); Jeffrey Haskell Derby, Chapel Hill, NC (US); Ajay Dholakia, Gattikon (CH); Evangelos Stavros Eleftheriou, Zurich (CH); Dongming Hwang, Cary, NC (US); Fredy D. Neeser, Langnau (CH); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/264,475

(22) Filed: Mar. 8, 1999

(51) Int. Cl.$^7$ .......................... H04B 17/00; H04B 3/46; H04B 1/20
(52) U.S. Cl. ....................................... 375/227; 375/350
(58) Field of Search ................................ 375/219, 220, 375/222, 224, 225, 227, 229, 230, 285, 346, 348, 350; 714/704, 746

(56) References Cited

U.S. PATENT DOCUMENTS

| | | | |
|---|---|---|---|
| 3,557,308 A | 1/1971 | Alexander et al. | 178/69.5 |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |

(List continued on next page.)

FOREIGN PATENT DOCUMENTS

| | | | |
|---|---|---|---|
| EP | 0 473 116 A | 8/1991 | H04N/1/00 |
| EP | 0 659 007 A2 | 11/1994 | H04M/11/06 |

(List continued on next page.)

OTHER PUBLICATIONS

Ayanoglu, et al.; *An Equalizer Design Technique for the PCM Modem: A New Modem for the Digital Public Switched Network*; IEEE Transactions on Communicatios; vol. 46, No. 6; Jun. 1988; pp. 763–774.

Picchi, G. et al.; *A blind Sag–So–DFD–FS equalizer*, Inst. Of Electron. & Telecommun., Pisa Univ., Italy, This paper appears in: Communications, 1988, ICC '88. Digital Technology—Spanning the Universe. Confereence Record., IEEE International Conference.

(List continued on next page.)

*Primary Examiner*—Jean B. Corrielus
(74) *Attorney, Agent, or Firm*—Carlos Munoz-Bustamante; Myers, Bigel, Sibley & Sajovec, P.A.

(57) ABSTRACT

Modems, methods, and computer program products select a data rate based on error signals in a modem. In an illustrative embodiment, error signals representing the difference between an output of an equalizer and an output of a detector are accumulated and an average error value is computed therefrom. A signal to noise ratio is determined using the average error value. The signal to noise ratio is then used to select a data rate. In another illustrative embodiment, the mean squared error at the output of the equalizer is determined and then used, along with the probability of error in correctly detecting a symbol, to select a data rate. Incorrect decisions in detecting received data symbols can cause a catastrophic failure in a decision feedback equalizer used in a modem receiver as errors are repeatedly fed back causing the tap coefficients for the equalizer filters to be shifted from their normal operating values. By adjusting the data rate in accordance with the error signals generated in a modem receiver, the decision feedback equalizer can operate with greater stability as the data rate can be reduced in response to increased noise conditions.

27 Claims, 23 Drawing Sheets

U.S. PATENT DOCUMENTS

| | | | |
|---|---|---|---|
| 4,237,552 A | 12/1980 | Aikoh et al. ................... 370/83 |
| 4,270,027 A | 5/1981 | Agrawal et al. .......... 179/81 R |
| 4,434,322 A | 2/1984 | Ferrell ..................... 178/22.13 |
| 4,450,556 A | 5/1984 | Boleda et al. ................ 370/58 |
| 4,539,675 A | 9/1985 | Fisher ......................... 370/32 |
| 4,577,310 A | 3/1986 | Korsky et al. ................ 370/58 |
| 4,578,796 A | 3/1986 | Charalambous et al. ....... 375/8 |
| 4,720,861 A | 1/1988 | Bertrand ..................... 381/36 |
| 4,760,598 A | 7/1988 | Ferrell ......................... 380/44 |
| 4,797,898 A | 1/1989 | Martinez ....................... 375/7 |
| 4,868,863 A | 9/1989 | Hartley et al. ................ 379/98 |
| 4,884,285 A | 11/1989 | Heynen et al. ............... 375/25 |
| 4,890,303 A | 12/1989 | Bader ......................... 375/107 |
| 4,901,333 A | 2/1990 | Hodgkiss ..................... 375/98 |
| 4,972,360 A | 11/1990 | Cuckier et al. ........ 364/724.04 |
| 4,985,902 A | 1/1991 | Gurcan ........................ 375/14 |
| 4,995,030 A | 2/1991 | Helf ......................... 370/32.1 |
| 5,007,047 A | 4/1991 | Sridhar et al. ............. 370/32.1 |
| 5,014,299 A | 5/1991 | Klupt et al. .................. 379/98 |
| 5,033,062 A | 7/1991 | Morrow et al. ................ 375/7 |
| 5,040,190 A | 8/1991 | Smith et al. ................... 375/4 |
| 5,052,000 A | 9/1991 | Wang et al. .................. 371/43 |
| 5,067,125 A | 11/1991 | Tsuchida ..................... 370/79 |
| 5,119,401 A | 6/1992 | Tsujimoto .................... 375/14 |
| 5,119,403 A | 6/1992 | Krishnan ..................... 375/39 |
| 5,134,611 A | 7/1992 | Steinka et al. ................ 370/79 |
| 5,157,690 A | 10/1992 | Buttle ......................... 375/14 |
| 5,210,755 A | 5/1993 | Nagler et al. ............... 370/108 |
| 5,249,205 A | 9/1993 | Chennakeshu et al. ..... 375/101 |
| 5,253,291 A | 10/1993 | Naseer et al. ............... 379/406 |
| 5,271,011 A | 12/1993 | McMullan, Jr. et al. ..... 371/5.3 |
| 5,291,479 A | 3/1994 | Vaziri et al. ............... 370/58.2 |
| 5,293,401 A | 3/1994 | Serfaty ........................ 375/13 |
| 5,309,484 A | 5/1994 | McLane et al. ............. 375/106 |
| 5,394,110 A | 2/1995 | Mizoguchi .................. 329/304 |
| 5,394,437 A | 2/1995 | Ayanoglu et al. ........... 375/222 |
| 5,406,583 A | 4/1995 | Dagdeviren ..................... 375/5 |
| 5,436,930 A | 7/1995 | Bremar et al. ............. 375/295 |
| 5,448,595 A * | 9/1995 | Kaku et al. |
| 5,471,508 A | 11/1995 | Koslov ....................... 375/344 |
| 5,490,169 A | 2/1996 | Blackwell et al. .......... 375/232 |
| 5,513,213 A * | 4/1996 | Patel et al. .................. 375/222 |
| 5,517,213 A | 5/1996 | Bhatt et al. .................. 375/232 |
| 5,526,378 A | 6/1996 | Knutson et al. ............. 375/229 |
| 5,528,625 A | 6/1996 | Ayanoglu et al. ........... 375/222 |
| 5,528,679 A | 6/1996 | Taarud ........................ 379/34 |
| 5,534,913 A | 7/1996 | Majeti et al. .................. 348/7 |
| 5,546,395 A | 8/1996 | Sharma et al. ................ 370/84 |
| 5,588,025 A | 12/1996 | Strolle et al. ............... 375/316 |
| 5,598,401 A | 1/1997 | Blackwell et al. ............ 379/94 |
| 5,668,833 A | 9/1997 | Kurokami et al. .......... 375/233 |
| 5,710,793 A | 1/1998 | Greenberg .................. 375/232 |
| 5,729,226 A | 3/1998 | Betts et al. .................... 341/94 |
| 5,742,642 A | 4/1998 | Fertner ....................... 375/233 |
| 5,754,594 A | 5/1998 | Betts et al. .................. 375/285 |
| 5,757,849 A | 5/1998 | Gelblum et al. ............ 375/222 |
| 5,761,247 A | 6/1998 | Betts et al. .................. 375/316 |
| 5,768,311 A | 6/1998 | Betts et al. .................. 375/222 |
| 5,778,024 A | 7/1998 | McDonough ............... 375/216 |
| 5,784,405 A | 7/1998 | Betts et al. .................. 375/222 |
| 5,793,809 A | 8/1998 | Holmquist .................. 375/242 |
| 5,801,695 A | 9/1998 | Townshend ................. 375/340 |
| 5,809,059 A * | 9/1998 | Souissi et al. |
| 5,809,075 A | 9/1998 | Townshend ................. 375/254 |
| 5,831,561 A | 11/1998 | Cai et al. .................... 341/106 |
| 5,835,538 A | 11/1998 | Townshend ................. 375/295 |
| 5,987,069 A | 11/1999 | Furukawa et al. .......... 375/285 |
| 5,999,349 A | 12/1999 | Choi ........................... 360/46 |
| 6,002,723 A | 12/1999 | Chethik ...................... 375/317 |
| 6,005,893 A | 12/1999 | Hyll ........................... 375/260 |
| 6,052,412 A | 4/2000 | Ruether et al. ............. 375/231 |
| 6,075,797 A * | 6/2000 | Thomas |
| 6,081,822 A | 6/2000 | Hillery et al. ............... 708/445 |
| 6,091,824 A | 7/2000 | Lin et al. ....................... 381/63 |
| 6,141,378 A | 10/2000 | d'Orcye de Lantremange ............... 375/232 |
| 6,148,423 A | 11/2000 | Le Mouel et al. .......... 714/708 |
| 6,151,364 A | 11/2000 | Ruether et al. ............. 375/254 |
| 6,151,614 A | 11/2000 | Ikeda .......................... 708/322 |
| 6,167,095 A | 12/2000 | Furukawa et al. .......... 375/285 |
| 6,205,129 B1 * | 3/2001 | Esteves et al. |
| 6,215,818 B1 * | 4/2001 | Velez et al. |
| 6,240,128 B1 | 5/2001 | Banerjea et al. ............ 375/222 |
| 6,292,654 B1 | 9/2001 | Hessel et al. ................ 455/223 |
| 6,304,594 B1 | 10/2001 | Salinger ...................... 375/222 |
| 6,341,360 B1 | 1/2002 | Abdelilah .................... 714/704 |

FOREIGN PATENT DOCUMENTS

| | | | | |
|---|---|---|---|---|
| EP | 0 669 740 A2 | 12/1994 | .......... H04L/27/00 |
| FR | 2 345 019 | 3/1976 | .......... H04L/27/10 |
| WO | WO 96/18261 | 6/1996 | .......... H04M/11/00 |
| WO | WO 98/37657 | 8/1998 | |

OTHER PUBLICATIONS

Erup, et al., "Interpolation in Digital Modems—Part II: Implementation and Performance," IEEE Transactions on Communications, vol. 41, No. 6, Jun. 6, 1993, pp. 998–1008.

Fischer, "Signal Mapping for PCM Modems," V–pcm Rapporteur Meeting, Sunriver, Oregon, USA, Sep. 4–12, 1997, 5 pgs.

Gardner, "Interpolation in Digital Modems—Part I: Fundamentals," IEEE Transactions on Communications, vol. 41, No. 3, Mar. 1993, pp. 501–507.

Humblet et al., "The Information Driveway," IEEE Communications Magazine, Dec. 1996, pp. 64–68.

Kalet et al., "The Capacity of PCM Voiceband Channels," IEEE International Conference on Communications '93, May 23–26, 1993, Geneva, Switzerland, pp. 507–511.

Mueller et al., "Timing Recovery in Digital Synchronous Data Receiver," IEEE Transactions on Communications, vol. Com–24, No. 5, May 1976, pp. 516–531.

Okubo et al., "Building Block Design of Large Capacity PCM–TDMA Subscriber System and Direct Digital Interface to Digital Exchange," Japan Radio Co., Ltd., Japan, pp. 69–73.

Pahlavan et al., "Nonlinear Quantization and the Design of Coded and Uncoded Signal Constellations," IEEE Transactions on Communications, vol. 39, No. 8, Aug. 1991, pp. 1207–1215.

Proakis, "Digital Signaling Over a Channel with Intersymbol Interference," Digital Communications, McGraw–Hill Book Company, 1983, pp. 373, 381.

Williams et al., "Counteracting the Quantisation Noise from PCM Codecs," BT Laboratories, UK, pp. 24–29.

\* cited by examiner

MODEMS, METHODS, AND COMPUTER PROGRAM PRODUCTS FOR SELECTING AN OPTIMUM DATA RATE USING ERROR SIGNALS REPRESENTING THE DIFFERENCE BETWEEN THE OUTPUT OF AN EQUALIZER AND THE OUTPUT OF A SLICER OR DETECTOR

CROSS REFERENCE TO RELATED APPLICATIONS

This application is related to U.S. application Ser. No. 09/264085, entitled RECEIVERS, METHODS, AND COMPUTER PROGRAM PRODUCTS FOR AN ANALOG MODEM THAT RECEIVES DATA SIGNALS FROM A DIGITAL MODEM (Docket No. RA9-98-074), U.S. application Ser. No. 09/264272, entitled MODEMS, METHODS, AND COMPUTER PROGRAM PRODUCTS FOR IDENTIFYING A SIGNALING ALPHABET IN VARIANCE WITH AN IDEAL ALPHABET DUE TO DIGITAL IMPAIRMENTS (Docket No. RA9-98-075) now U.S. Pat No. 6,384,064, U.S. application Ser. No. 09/264094, entitled DECISION FEEDBACK EQUALIZERS, METHODS, AND COMPUTER PROGRAM PRODUCTS FOR DETECTING SEVERE ERROR EVENTS AND PRESERVING EQUALIZER FILTER CHARACTERISTICS IN RESPONSE THERETO (Docket No. RA9-98-076) now U.S. Pat. No. 6,341,360, U.S. application Ser. No. 09/264422, entitled MODEMS, METHODS, AND COMPUTER PROGRAM PRODUCTS FOR RECOVERING FROM ERRORS IN A TONE REVERSAL SEQUENCE BETWEEN TWO MODEMS (Docket No. RA9-98-078) now U.S. Pat. No. 6,487,243, and U.S. application Ser. No. 09/264421, entitled MODEMS, METHODS, AND COMPUTER PROGRAM PRODUCTS FOR FALLING BACK TO A LOWER DATA RATE PROTOCOL UPON DETECTING ABNORMAL LINE CONDITIONS DURING STARTUP (Docket No. RA9-98-079) now U.S. Pat. No. 6,381,267, which are filed contemporaneously herewith and the disclosures of which are incorporated herein by reference

FIELD OF THE INVENTION

The present invention relates generally to the field of modems, and, more particularly, to using error signals in a modem as a basis for selecting a data rate.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the public switched telephone network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. The ISDN offers comfortable data rates for Internet access, telecommuting, remote education services, and some forms of video conferencing. ISDN deployment, however, has been very slow due to the substantial investment required of network providers for new equipment. Because the ISDN is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). In recent years, local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard.

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions outside of the conversion made at the subscriber's modem to enable transmission at 56 kbps.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. The PCM codewords are modulated using a technique known as pulse amplitude modulation (PAM) in which discrete analog voltage levels are used to represent each of the 256 PCM codewords. These PAM signals are transmitted towards the PSTN by the PAM transmitter 36 where they are received by a network codec. No information is lost in converting the PAM signals back to PCM because the codec is designed to interpret the various voltage levels as corresponding to particular PCM codewords without sampling the PAM signals. The PCM data is then transmitted through the PSTN 28 until reaching the central office 32 to which the client modem 34 is connected. Before transmitting the PCM data to the client modem 34, the data is converted from its current form as either μ-law or A-law companded PCM codewords to PAM voltages by the codec expander (digital-to-analog (D/A) converter) 38. These PAM voltages are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 can introduce quantization noise, which may limit the data rate as discussed hereinbefore. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either μ-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard only offers increased data rates (e.g., data rates up to 56 kbps) in the downstream direction from a server to a subscriber or client. Upstream communication still takes place at conventional data rates as provided for in the V.34 standard. Nevertheless, this asymmetry is particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists of mainly keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, limit the maximum data rate. Furthermore, the μ-law or A-law companding techniques do not use uniform PAM voltage levels for defining the PCM codewords. The PCM codewords representing very low levels of sound have PAM voltage levels spaced close together. Noisy transmission facilities can prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and subsequent analog-to-digital conversion in the path. Nevertheless, other digital impairments, such as robbed bit signaling (RBS) and digital mapping through packet assemblers/disassemblers (PADS), which results in attenuated signals, can also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

U.S. Pat. Nos. 5,801,695 and 5,809,075 to Townshend appear to disclose a modem for data transmission over existing telephone lines at data rates higher than conventional analog modems.

Articles such as Humblet et al., "The Information Driveway," IEEE Communications Magazine, December 1996, pp. 64–68, Kalet et al., "The Capacity of PCM Voiceband Channels," IEEE International Conference on Communications '93, May 23–26, 1993, Geneva, Switzerland, pp. 507–511, Fischer et al., "Signal Mapping for PCM Modems," V-pcm Rapporteur Meeting, Sunriver, Oreg., USA, Sep. 4–12, 1997, and Proakis, "Digital Signaling Over a Channel with Intersymbol Interference," Digital Communications, McGraw-Hill Book Company, 1983, pp. 373, 381, provide general background information on digital communication systems.

Nevertheless, there exists a need for improvements in V.90 modem technology to allow V.90 modems to achieve more closely the theoretical 56 kbps maximum data rate.

SUMMARY OF THE INVENTION

Certain objects, advantages, and features of the invention will be set forth in the description that follows and will become apparent to those skilled in the art upon examination of the following or may be learned with the practice of the invention.

It is an object of the present invention to provide an improved modem having a data rate selection capability.

It is a further object of the present invention to provide data rate selection that achieves a high data rate for differing line conditions.

These and other objects, advantages, and features of the present invention are provided by modems having a data rate selection capability, and methods and computer program products for selecting a data rate based on error signals in a modem. In accordance with an aspect of the invention, error signals representing the difference between an output of an equalizer and an output of a detector are accumulated and an average error value is computed therefrom. A signal to noise ratio is determined using the average error value. The signal to noise ratio is then used to select a data rate.

Incorrect decisions in detecting received data symbols can cause a catastrophic failure in a decision feedback equalizer used in a modem receiver as errors are repeatedly fed back causing the tap coefficients for the equalizer filters to be shifted from their normal operating values. By adjusting the data rate in accordance with the error signals generated in a modem receiver, the decision feedback equalizer can operate with greater stability as the data rate can be reduced in response to increased noise conditions.

In accordance with another aspect of the present invention, a bonus amount is initially added to the signal to noise ratio and is then subtracted over a period of time. The temporary bonus amount anticipates a final, steady state signal to noise ratio and is therefore removed over time as the signal to noise ratio approaches its steady state value. Advantageously, the performance of the modem receiver is improved (i.e., a higher data rate is selected) during the interim time taken for the signal to noise ratio to reach its steady state value.

In accordance with still another aspect of the present invention, the mean squared error at the output of the decision feedback equalizer is determined and then used, along with the probability of error in correctly detecting a symbol, to select a data rate.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
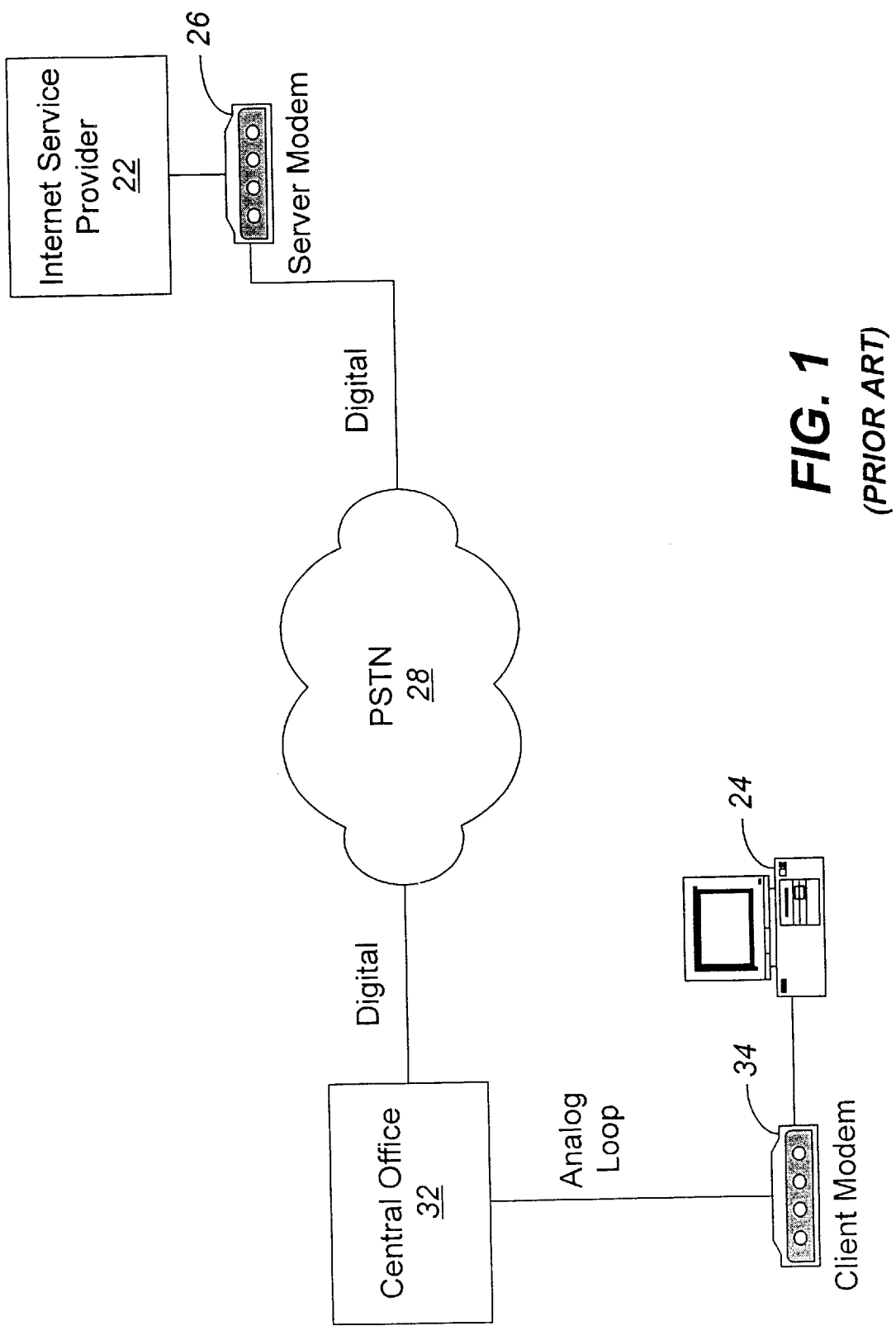
FIG. 1 is block diagram illustrating a typical V.90 connection between a subscriber and an ISP in accordance with the prior art.
Figure 2:
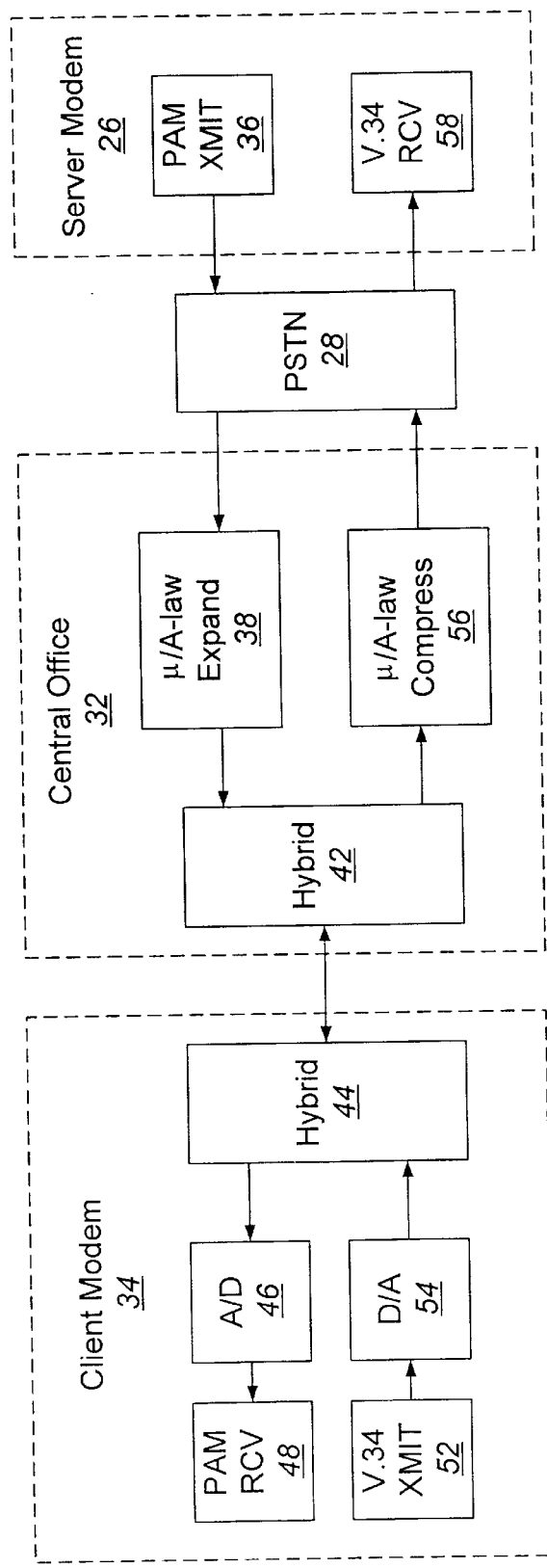
FIG. 2 is a detailed block diagram of the internal architecture and connections between the client modem, the central office, and the server modem of FIG. 1.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a digital signal processing system, or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention is typically written in a high level programming language such as C or C++. Nevertheless, some modules or routines may be written in assembly or machine language to optimize speed, memory usage, or layout of the software or firmware in memory. Assembly language is typically used to implement time-critical code segments. In a preferred embodiment, the present invention uses assembly language to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

Figure 3:
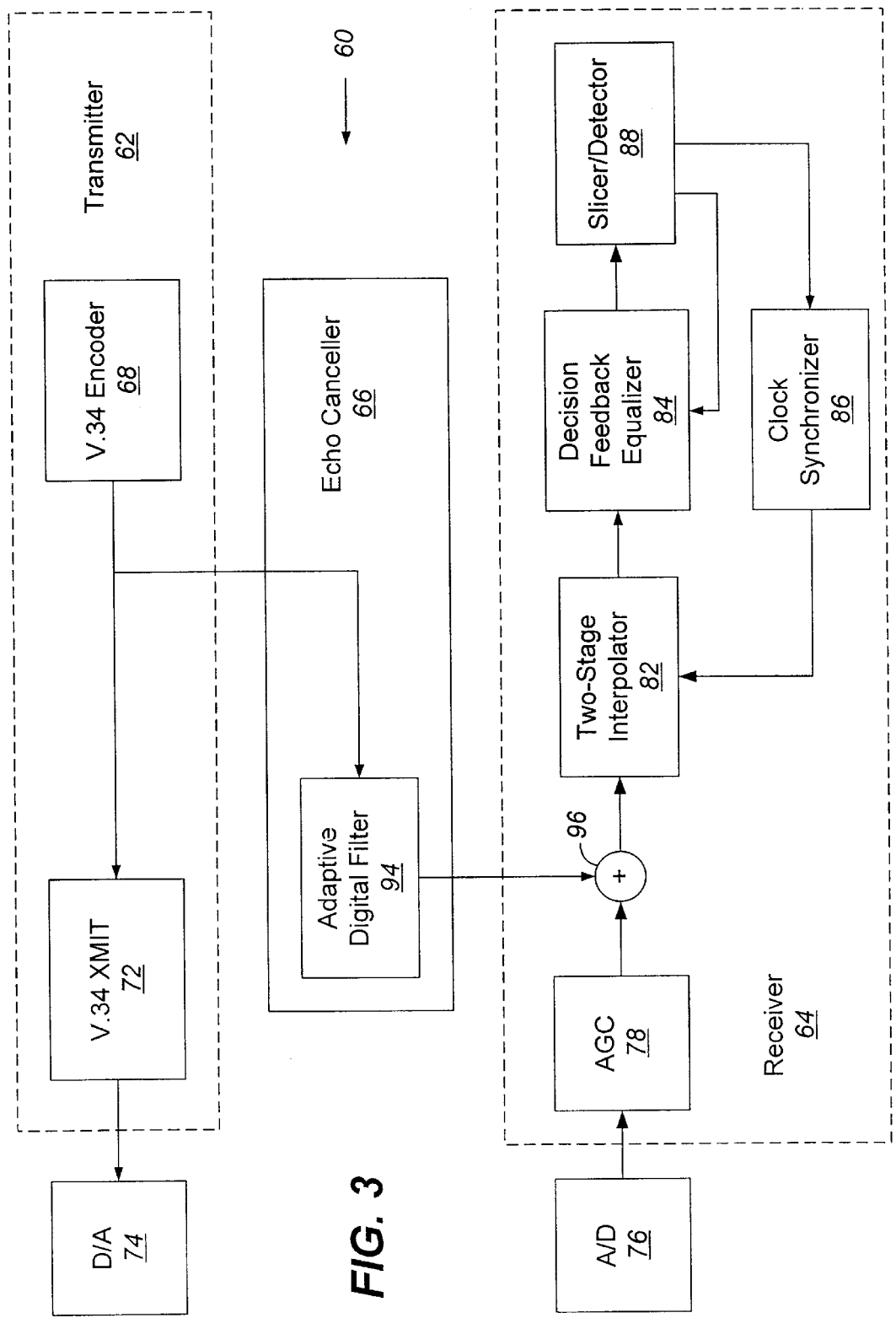
FIG. 3 is a block diagram of a V.90 client modem in accordance with the present invention.

A block diagram of a V.90 client modem 60 according to one embodiment of the present invention is shown in FIG. 3. The V.90 modem 60 includes a V.34 transmitter 62 and a PAM receiver 64, which are coupled together by an echo canceller 66. The transmitter 62 includes a V.34 encoder 68 that encodes the data to be transferred, typically using trellis coding, and then provides the encoded data to a V.34 transmit unit 72. The V.34 transmit unit 72 in conjunction with the D/A converter 74 transmits the encoded data towards the network using, for example, QAM modulation.

The receiver 64 receives a PAM signal from the network through an A/D converter 76. The digital samples from the A/D converter 76 are applied to an automatic gain control (AGC) component 78, which applies the necessary amount of gain to compensate for attenuation in the network and/or in the local loop.

Once the digitized signal has been amplified by the AGC component 78, the signal is received in a two-stage interpolator 82. The two-stage interpolator 82 is used in conjunction with an adaptive fractionally spaced decision feedback equalizer (DFE) 84 to match the sampling rate of the receiver 64 with the sampling rate of the network, which is typically 8000 samples per second. In addition, because the sampling rate at the receiver 64 is based on the local clock in the modem 60 while the sampling rate of the network is based on the network clock, a clock synchronizer 86 is used to synchronize the digital samples processed by the two-stage interpolator 82 with the network clock. After the digitized signal is filtered by the decision feedback equalizer 84, the signal is received by the slicer/detector 88, which converts the digital samples into indices by comparing the digital samples with thresholds that are half-way between indexed reference signal levels comprising the PAM signaling alphabet.

When the V.34 signal transmitted by transmitter 62 is received by the line termination equipment in the central office, portions of this signal may reflect back towards the V.90 client modem 60, thereby creating a disturbing echo signal superimposed on the incoming PAM signals. The echo canceller 66 is used to filter out this echo signal so that it does not interfere with the performance of the receiver 64. More specifically, the echo canceller 66 receives a complex T-spaced symbol stream from the V.34 encoder 68 and produces a real, T/k fractionally spaced stream symbol stream as an output, where k is an integer number and T refers to the modulation interval, which is generally given by the inverse of the symbol (baud) or sample rate. Selection of the integer k depends on the sampling rate used by the front end of the receiver 64 (i.e., the A/D converter 76 and the AGC 78). The echo canceller 66 in accordance with the present invention comprises an adaptive digital filter 94 that performs both an interpolation function as well as a filtering function. The sampling rate used in the V.34 encoder 68 is different from the sampling rate used by the front end of the receiver 64. In a preferred embodiment, the V.34 encoder 68 operates at 3200 samples per second while the digital samples from the AGC 78 are output at 9600 samples per second. Thus, the adaptive digital filter 94 is used to match the sampling rate of the transmitter 62 with the sampling rate of the receiver 64 by interpolating the samples from the V.34 encoder 68 up to the 9600 samples per second rate. To achieve this level of interpolation, k is typically set to three in a preferred embodiment. Note that because the transmitter 62 and the receiver 64 share the same local clock, the echo canceller 66 need not perform a clock synchronization function in addition to the interpolation.

The adaptive digital filter 94 can be implemented as a finite impulse response (FIR) filter comprising a tapped delay line with associated tap coefficients. The output from the adaptive digital filter 94 is combined with the digitized signal from the AGC 78 in an adder 96. Desirably, the output from the adaptive digital filter 94 should complement the echo signal reflecting back from the local loop to effectively cancel its effect upon the received PAM signal. Because the symbols from the V.34 encoder 68 are generally encoded as complex values when QAM modulation is used, the tap coefficients for the adaptive digital filter 94 are designed to convert from the complex domain to the real domain as the digital samples representing the PAM signals in the receiver 64 are real values. Typically, the tap coefficients for the adaptive digital filter 94 are trained during a startup interval for the V.90 modem 60 in which test signals are transmitted from the transmitter 62 and the coefficients are adjusted until the output from the adder 96 is approximately null.

Figure 4:
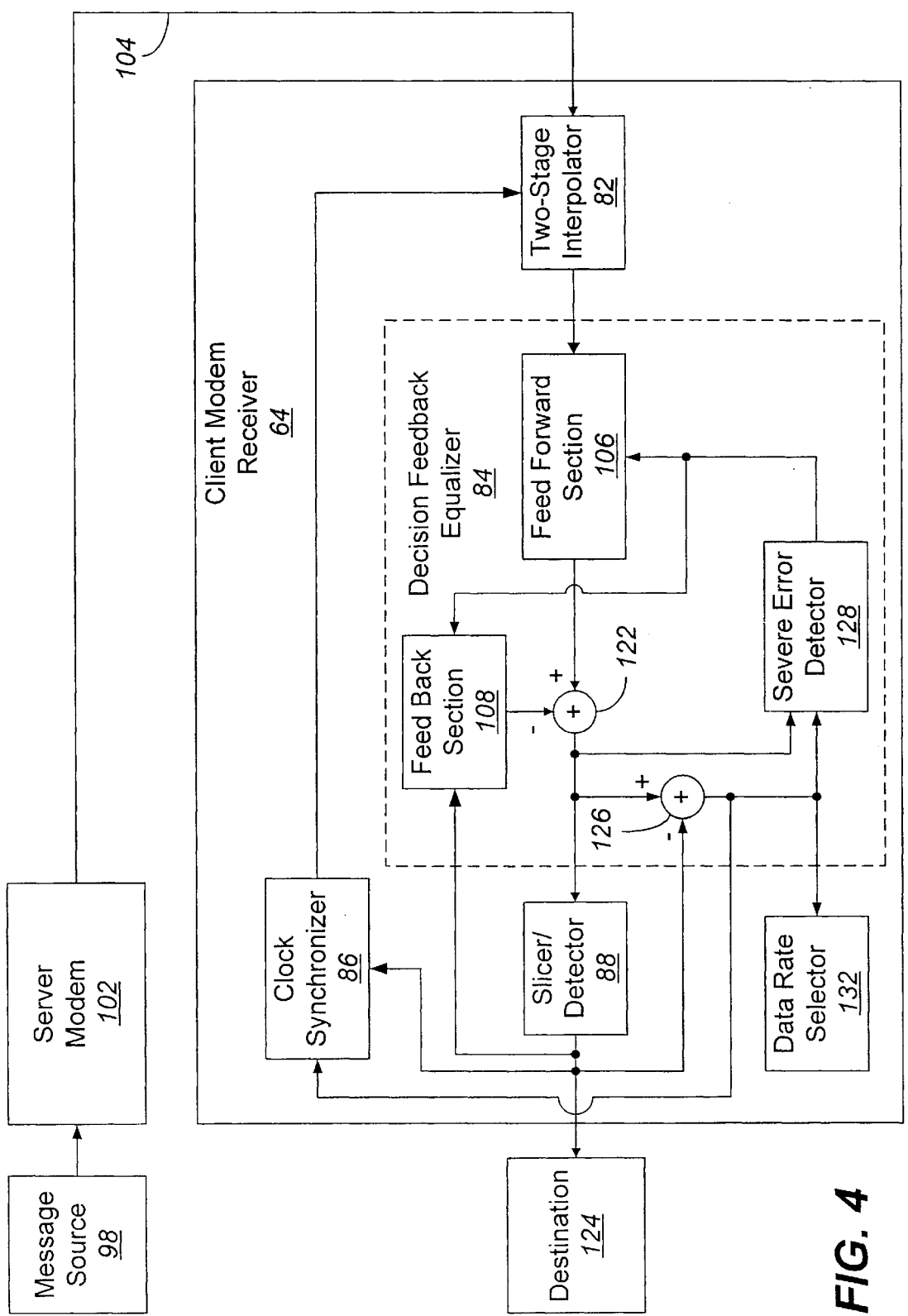
FIG. 4 is a more detailed diagram of the receiver used in the V.90 modem of FIG. 3.

With reference now to FIG. 4, the architecture of the receiver 64 will be described in greater detail. Information from a message source 98, such as an ISP, is transmitted via a V.90 server modem 102 through the PSTN until reaching the local loop to which the client modem receiver 64 is connected. The connection through the PSTN, including the line card in the central office 32, the local loop, and the front end of the receiver 64 (including the echo cancellation performed by the echo canceller 66 and the adder 96), are represented by the communication path 104 in FIG. 4.

As described above with reference to FIG. 3, the two-stage interpolator 82 is used in conjunction with the decision feedback equalizer 84 to match the sampling rate of the receiver 64 with the sampling rate of the network, which is 8000 samples per second. In a preferred embodiment, the sampling rate used by the A/D converter 76 and the AGC 78 is 9600 samples per second. The decision feedback equalizer 84 comprises a feed forward section 106 and a feed back section 108 and typically provides some level of interpolation or decimation to the sampling rate. For example, in a preferred embodiment of the present invention, the feed forward section 106 receives input samples with a sampling interval of T/q and filters these input samples through use of a tapped delay line having a tap spacing of pT/q. Recall that T corresponds to the modulation interval, which is 1/8000 samples per second (i.e., the network sampling rate) in a preferred embodiment of the present invention. The specific choice of values for p and q is generally based on a compromise between computational complexity, storage requirements, and bandwidth availability. In a preferred embodiment, p and q are set to three and four respectively; therefore, the two-stage interpolator 82 interpolates the digital samples from 9600 samples per second up to 32000 samples per second. Then, once the samples are decimated by the decision feedback equalizer 84, the digital samples are provided to the slicer/detector 88 at the network sampling rate of 8000 samples per second.

Figure 5:
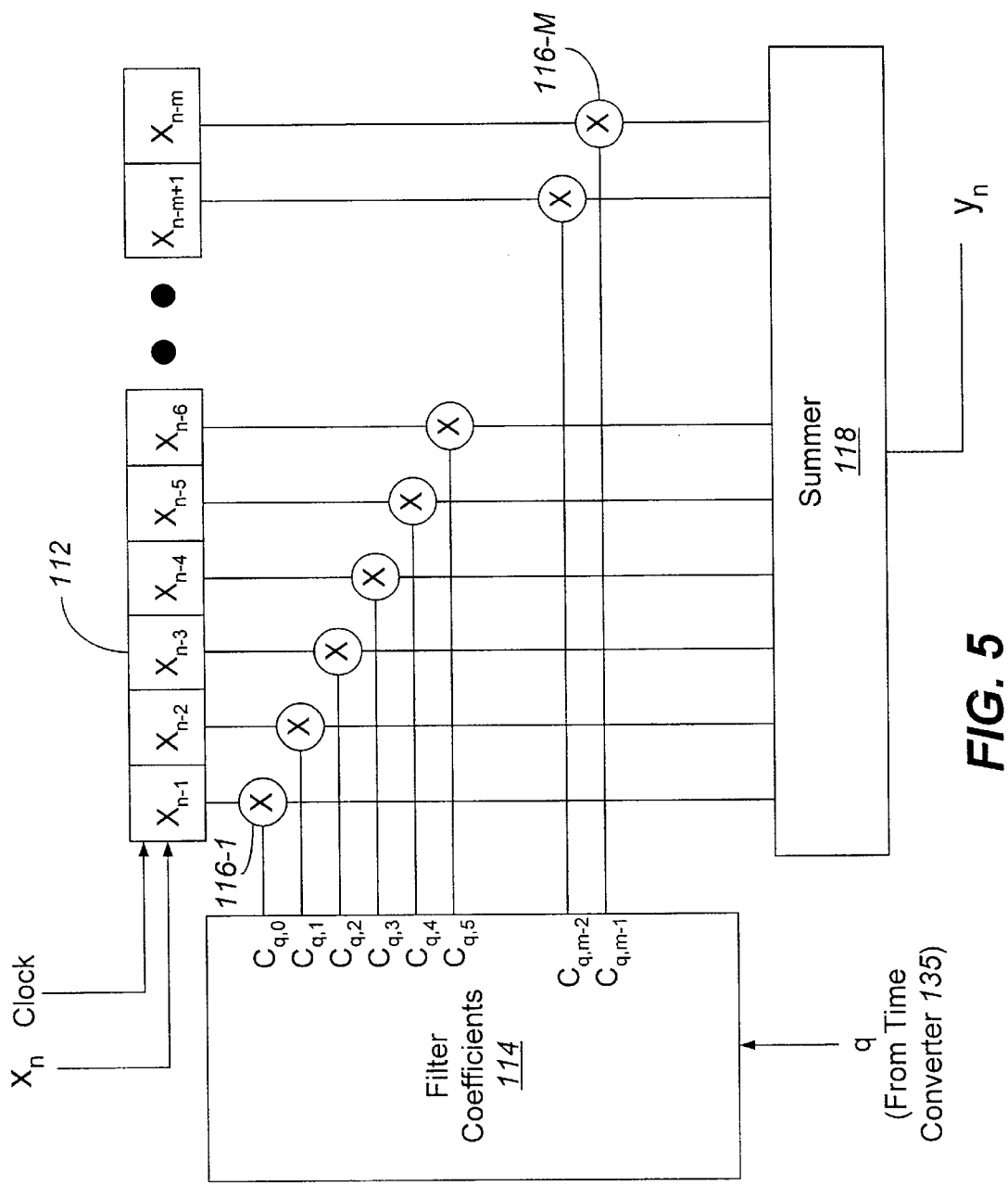
FIG. 5 is a block diagram of an adaptive digital filter of the type used in the adaptive fractionally spaced decision feedback equalizer, echo canceller, and two-stage interpolator of FIGS. 3 and 4.

FIG. 5 shows the general structure of an adaptive FIR filter, which is a preferred implementation for the feed forward section 106, the feed back section 108, and the adaptive digital filter 94 (see FIG. 3) used in the echo canceller 66. The operation of an FIR digital filter can generally be represented by Equation 3 set forth below:

$$Y_n = \sum_{k=1}^{k=m} C_k^n X_{n-k}$$ EQ. 3 where $Y_n$ is the output at time n, $$C_k^n$$

is the $k^{th}$ coefficient at time n and $X_{n-k}$ is the input at time n-k. Typically, the collection of samples $X_{n-1}$ through $X_{n-m}$ are stored in a tapped delay line 112. The characteristics of the filter are determined by the values of the coefficients 114 at time n. Each coefficient is also called a tap weight or tap coefficient. Each coefficient, $$C_k^n,$$

is used to multiply the respective sample of X(t) through a corresponding multiplier 116-i with the result that $Y_n$ is equal to the sum of the products of the coefficients and the respective m samples of X(t), which is output from a summer 118. This approach of generating output samples $Y_n$ based on a weighted summation of prior-in-time input samples combats the effects of noise, attenuation, and inter-symbol interference (ISI) due to delay and distortion caused by the equivalent channel 104.

Returning to FIG. 4, the feed forward section 106 is thus used to filter the digital samples received from the two-stage interpolator 82 to counteract the effects of channel amplitude and phase distortion due to the equivalent channel 104. These filtered samples are then applied to the slicer/detector 88 through an adder 122. The slicer/detector 88 converts the digital samples from the output of the adder 122 to indices by comparing the samples with a PAM signaling alphabet comprising indexed reference signal levels. Ultimately, these indices are decoded into a stream of digital data to be provided to the destination 124 that corresponds to the original data sent from the message source 98. The slicer/detector 88 also outputs the reference signal levels corresponding to these indices. This second output of the slicer/detector 88 is provided to the feed back section 108, the adder 126, and the clock synchronizer 86.

A first feedback loop is formed through an adder 126 for computing the error signal, which is defined as the difference between the received signal at the input of the slicer/detector 88 and the detected signal as determined by the slicer/detector 88. This error signal is used to adapt the coefficients of the feed forward section 106 and the feed back section 108 to the characteristics of the equivalent channel 104. Nevertheless, should a momentary intrusion of noise cause the error signal to sharply increase in magnitude, a severe error detector 128 is used to prevent an undesired disturbance to the coefficients of the feed forward and feed back sections 106, 108. Thus, the severe error detector 128 provides a measure of stability for the decision feedback equalizer 84 under transient high noise conditions.

A data rate selector component 132 computes the mean squared equalizer error (MSE) by squaring and low pass filtering the errors from the adder 126. Moreover, the data rate selector 132 can select the optimum data rate based on the MSE and the limit on average power imposed by the applicable regulatory standard. The operation of both the data rate selector 132 and the severe error detector 128 will be described in greater detail hereinafter.

A second feedback loop is included that couples the output of the slicer/detector 88 through the feed back section 108 to the adder 122. The feed back section 108 is used to further refine the digital samples that are applied to the detector/slicer 88. Specifically, the signal samples input to the feed back section 108 are reference signal levels from the slicer/detector 88 and are thus uncorrupted by noise as long as the slicer/detector 88 is correctly estimating or detecting the transmitted PAM symbols. Therefore, the feed back section 108 is designed primarily to eliminate the effects of ISI due to the delay characteristics of the equivalent channel 104.

Finally, a third feedback loop is included that couples the sample output of the slicer/detector 88 as well as the error signal from the adder 126 through the clock synchronizer 86 to the two-stage interpolator 82. As discussed in the foregoing, the two-stage interpolator 82 in conjunction with the decision feedback equalizer 84 is used to match the sampling rate of the receiver 64 with the sampling rate used by the codec in the central office 32. In addition to matching the sampling rate, however, it may also be necessary to synchronize the local clock used in the V.90 modem 60 with the network clock to reliably demodulate and decode the incoming PAM signal. In accordance with the present invention, the clock synchronizer 86 controls the two-stage interpolator 82 to synchronize the receiver 64 clock with the network clock.

Figure 6:
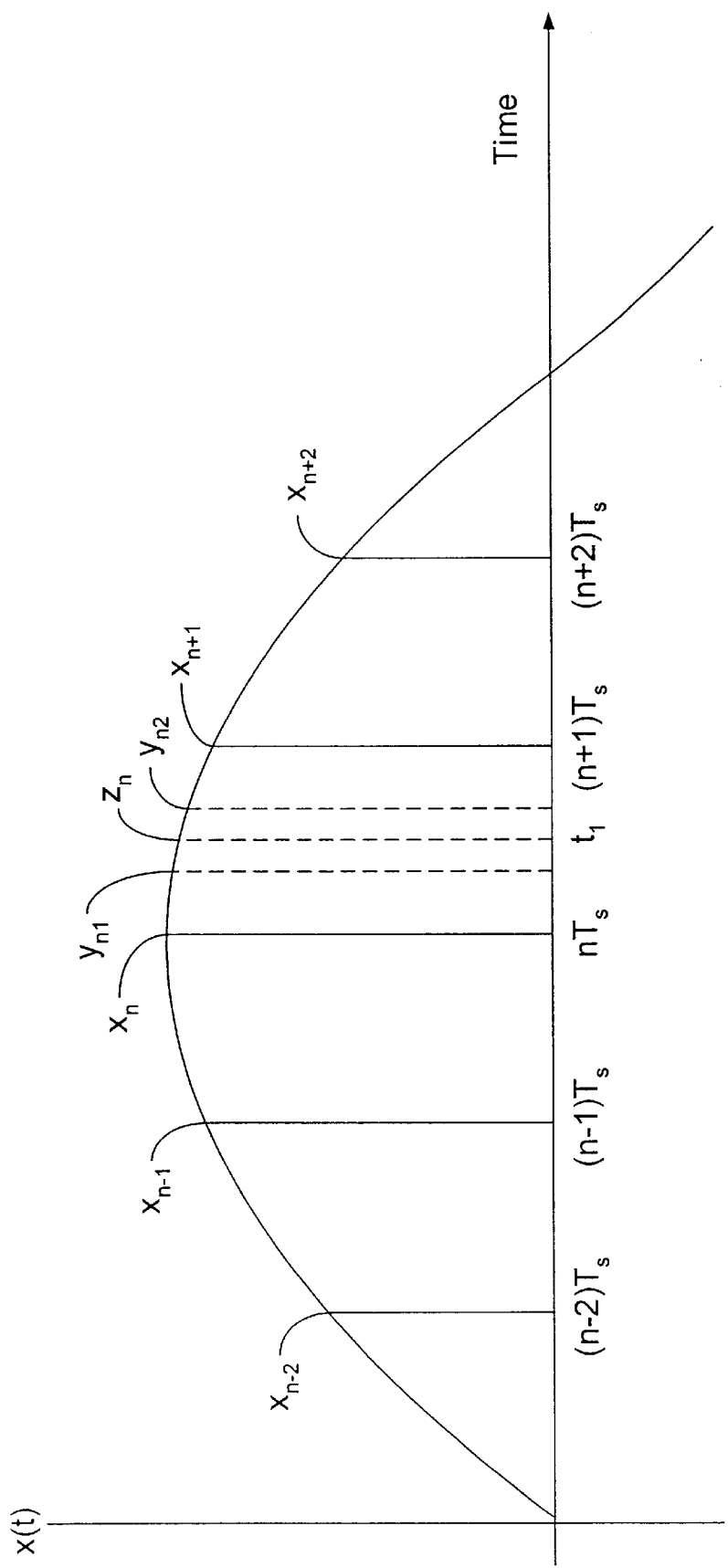
FIG. 6 is a diagram of a portion of a PAM signal illustrating the sampling instances and the interpolation points used by the two-stage interpolator of FIGS. 3 and 4 in accordance with the present invention.

The basic concept of digital interpolation is illustrated in FIG. 6. The input of the two-stage interpolator 82 is a sample $x_n$ of a time varying, bandlimited PAM signal $x(t)$ at time $nT_s$ where $T_s$ is the sample interval (ie., the inverse of the sample rate) at the input of the two-stage interpolator 82. The sample rates at the input and the output of the two-stage interpolator 82 are subject to drift with respect to one another because the output sample rate is locked by the clock synchronizer 86 to the network clock while the input sample rate is locked to the local lock of the client modem 60. The clock synchronizer 86 determines the desired sampling instant $t_1$ at which the input signal $x(t)$ ought to be sampled using known techniques such as those disclosed by Mueller et al., "Timing Recovery in Digital Synchronous Data Receivers," IEEE Transactions on Communications, Vol. Com-24, No. 5, May 1976, pp. 516–531, which is hereby incorporated herein by reference.

Inasmuch as the only samples of $x(t)$ that are available are at multiples of $T_s$ and $t_1$ falls in between two such sample instances ($nT_s$ and $(n+1)T_s$), the two-stage interpolator 82 determines the sample $z_n=x(t_1)$ by interpolation as shown in FIG. 6. Interpolation is performed in two steps to obtain a high resolution and to control the sampling instant in very fine increments. PCM modem receivers can suffer from coarse timing corrections because they typically operate at signal to noise ratios (SNRs) in the range of 45 dB to 55 dB.

Figure 7:
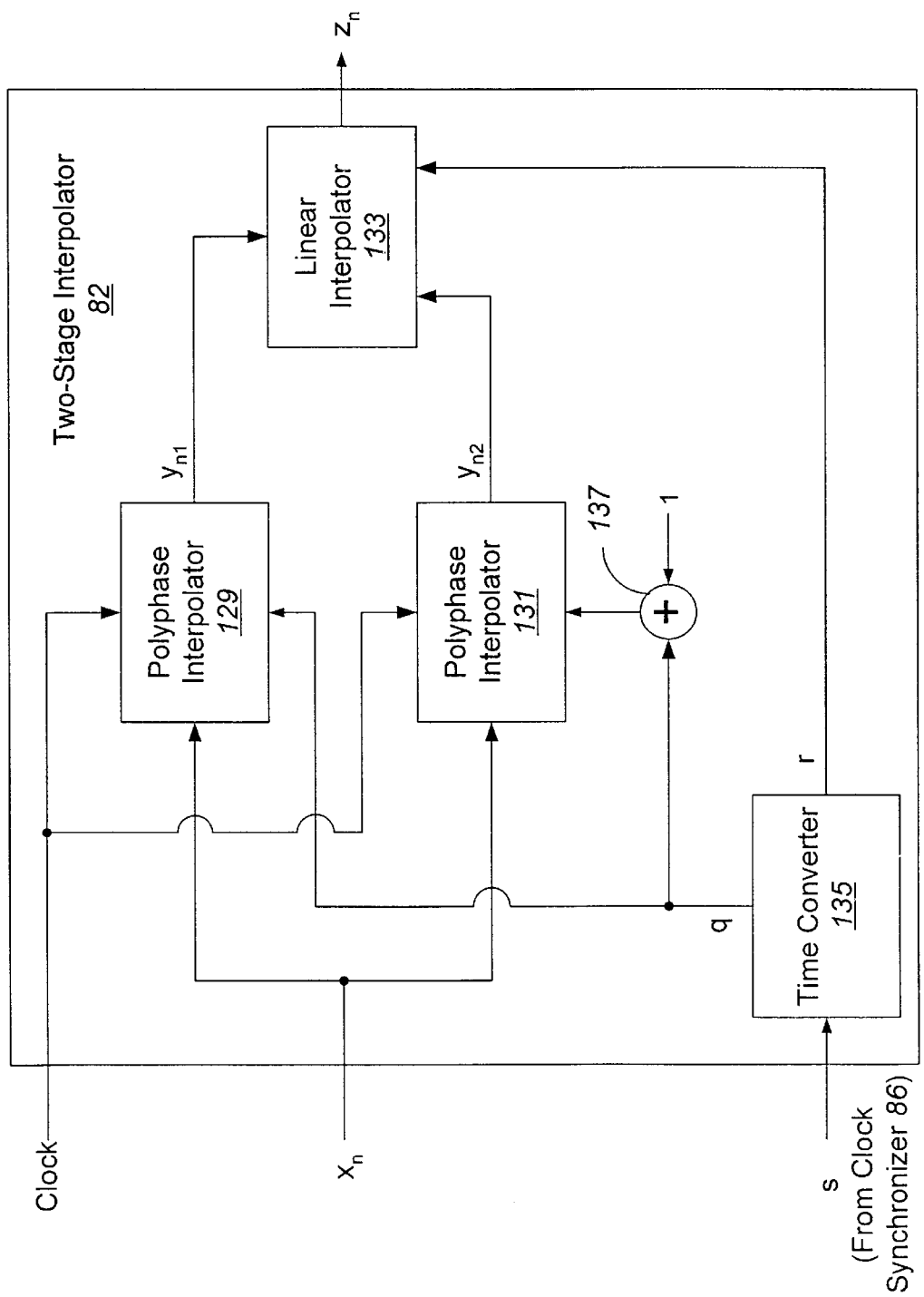
FIG. 7 is a block diagram of the two-stage interpolator of FIGS. 3 and 4.

With reference to FIG. 7, the two-stage interpolator 82 comprises a polyphase interpolator, consisting of two polyphase interpolator components 129 and 131, that receive the input sample $x_n$ and the clock signal of the client modem 60 and generate a pair of estimates, $y_{n1}$ and $y_{n2}$ respectively, of the signal $x(t)$. FIG. 5, which was discussed in detail hereinabove, is representative of the internal architecture of the polyphase interpolators 129 and 131. The two-stage interpolator 82 further comprises a linear interpolator 133 that is connected to the outputs of the polyphase interpolators 129 and 131 and generates the sample $z_n$ from the estimates $y_{n1}$ and $y_{n2}$. A time converter 135 provides an integer q to the polyphase interpolator 129 and to an adder 137 that increments q by one and provides q+1 to the polyphase interpolator 131. In addition, the time converter 135 provides a second integer r to the linear interpolator 133. The integers q and r are used by the polyphase interpolators 129 and 131 and the linear interpolator 133 in generating their respective outputs. The operation of the two-stage interpolator 82 is described hereafter.

The polyphase interpolator 129 obtains $y_{n1}$ as set forth in Equation 4:

$$y_{n1}=x(nT_s+qT_s/Q) \qquad \text{EQ. 4}$$

and the polyphase interpolator 131 obtains $y_{n2}$ as set forth in Equation 5:

$$y_{n2}=x(nT_s+(q+1)T_s/Q) \qquad \text{EQ. 5}$$

where Q is the number of phases or coefficient vectors of the respective polyphase interpolator 129 or 131, and q=floor $(Q((t-nT_s)/T_s))$, $0 \leq q < Q$. The linear interpolator 133 obtains $z_n$ as set forth in Equation 6:

$$z_n = \frac{(r)(y_{n1}) + (L-r)(y_{n2})}{L} \qquad \text{EQ. 6}$$

where L is the resolution of the linear interpolator 133 and r is an integer satisfying $0 \leq r < L$. The integer r is chosen such that the sampling instant $t_{inter}=nT_s+qT_s/Q+rT_s/(L)(Q)$ is as close as possible to $t_1$.

The integers q and r are generated by the time converter 135 based on a sampling index s received from the clock synchronizer 86 (see FIG. 4). The clock synchronizer 86 monitors the clock in the client modem 60 and determines a corresponding index n such that $0 \leq \text{delta}=t-nT_s<T_s$. The sampling index is given by $s=\text{floor}((L)(Q)(\text{delta})/(T_s))$. The integer q can then be obtained as $q=\text{floor}(s/L)$ and the integer r can be obtained as $r=s-(L)(q)$. For computational simplicity, L may be chosen as a power of two so that q can be obtained from s by a right shift of $\log_2(L)$ bits. Moreover, the remainder r is then given by the low $\log_2(L)$ bits of s.

The two-stage interpolator 82 according to the present invention provides the ability to perform extremely fine timing corrections. Conventional polyphase interpolators provide a resolution in the range of $T_s/16$ to $T_s/64$. In an illustrative embodiment of the present invention in which Q=120 and L=64, the resolution of the two-stage interpolator 82 is given by $T_s/(L)(Q)$, which is 13.6 nanoseconds at $T_s=1/9600$. Such a fine resolution may be required to make the two-stage interpolator 82 essentially transparent for the subsequent equalization. That is, timing corrections do not result in transient increases of the mean squared equalizer error. In addition, the two-stage interpolator 82 and clock synchronizer 86 are generally more computationally efficient than prior art timing recovery systems.

The various components comprising the receiver 64 are initialized as part of a multi-phase startup procedure for the V.90 modem 60. For example, the equalizer coefficients are initially set through a procedure known as training. In addition, other tasks such as gain control, network clock timing acquisition, and echo cancellation convergence are also resolved during the startup interval.

The receiver structure described hereinabove lends itself to an efficient implementation requiring approximately eighteen million instructions per second (MIPS) in a typical digital signal processor. Moreover, the receiver structure is compatible with existing analog front ends and transmitters designed for the V.34 or other comparable legacy recommendation standards.

V.90 Client Modem Receiver Software Architecture

Figure 8:
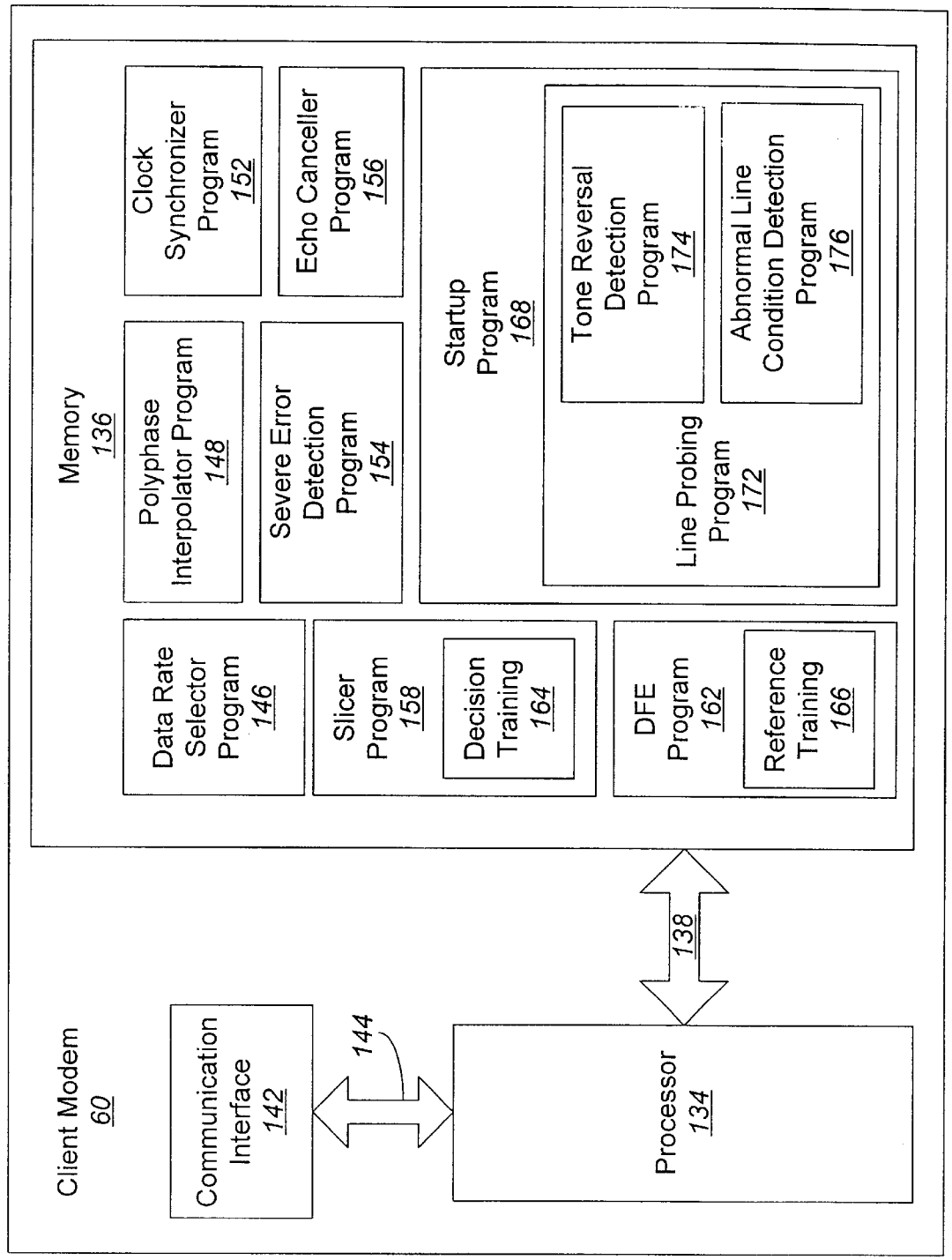
FIG. 8 is a block diagram illustrating the software architecture of the receiver of FIG. 4.

Referring now to FIG. 8, the software architecture for the receiver 64 and echo canceller 66 of the V.90 client modem 60 will be described. The client modem 60 includes a processor 134, preferably a digital signal processor, which communicates with a memory 136 via an address/data bus 138. In addition, the processor 134 can receive and transmit information to external devices via a communication interface 142, which is accessed through input/output (I/O) bus 144. The processor 134 can be any commercially available or custom processor suitable for a real-time intensive embedded application. The memory 136 is representative of the overall hierarchy of memory devices containing the software and data used to implement the functionality of the V.90 client modem 60. The memory 136 can include, but is not limited to, the following types of devices: cache, ROM, PROM, EPROM, EEPROM, flash, SRAM, and DRAM. As shown in FIG. 8, the memory 136 includes program modules for implementing the functionality of the components discussed in the foregoing with reference to FIGS. 3 and 4. That is, memory 136 includes a data rate selector program module 146, a polyphase interpolator program module 148, a clock synchronizer program module 152, a severe error detector program module 154, an echo canceller program module 156, a slicer program module 158, and a decision feedback equalizer (DFE) program module 162. Each of these program modules corresponds to a respective component of the V.90 client modem 60 shown in FIGS. 3 and 4.

The slicer program module 158 and the DFE program module 162 include a decision training program sub-module 164 and a reference training program sub-module 166 respectively, which are used as part of a signaling alphabet identification procedure in accordance with the present invention. The memory 136 further includes a startup program module 168 which implements the multi-phase startup protocol defined in the V.90 recommendation. More specifically, the startup program module 168 includes a line probing program sub-module 172 that is used in phase two of the multi-phase startup protocol defined in the V.90 recommendation. The line probing program sub-module 172 further includes a tone reversal detection program sub-module 174 and an abnormal line condition detection program sub-module 176. The tone reversal detection program sub-module 174 provides an improved method for determining the round-trip delay between a server modem and a client modem during the line probing/ranging phase of the startup protocol.

The abnormal line condition detection program sub-module 176 provides a method for efficiently falling back to a lower speed transmission protocol, such as that provided by the V.34 recommendation, if the communication path between the server modem 102 and the client modem receiver 64 is incapable of supporting a V.90 connection.

The present invention is described hereinafter with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

The operation and features provided by the decision training program and reference training program sub-modules 164 and 166, the severe error detector program module 154, the data rate selector program module 146, the tone reversal detection program sub-module 174, and the abnormal line condition detection program sub-module 176 will be described hereafter with reference to flow charts and with frequent reference to the architectural diagrams of FIGS. 3, 4, and 8.

Signaling Alphabet Learning Through Decision Training and Reference Training

Successful operation of the V.90 receiver 64 may depend on an accurate identification of the reference PAM signaling levels that are often called the signaling alphabet or the signal constellation. The digital samples that have been filtered by the decision feedback equalizer 84 are provided to the slicer/detector 88 where the samples are compared against the signaling alphabet (i.e., indexed reference signal levels). A determination is made with regard to which member of the alphabet or which point in the constellation the digital sample falls closest to. Once the alphabet member is identified, the PCM codeword corresponding to that alphabet member is selected as the symbol transmitted for that digital sample.

While a set of ideal signaling levels can be defined for the signaling alphabet, the effective alphabet will consistently deviate from these ideal levels because of underlying digital impairments resulting from RBS and PAD. Understanding that these impairments will be chronic throughout the communication session, it is more efficient for the receiver 64 to learn a new signaling alphabet that takes these impairments into account.

Nevertheless, alphabet identification is complicated in that the equalization process and the alphabet identification process are inter-dependent. Improved filtering of noise and transmission channel irregularities by the decision feedback equalizer 84 improves identification of the signaling alphabet at the slicer/detector 88. In addition, accurate alphabet identification at the slicer/detector 88 provides a more accurate error signal at the adder 126 for adapting the tap coefficients in the feed forward section 106.

The present invention uses a combination of reference training, in which the tap coefficients of the decision feedback equalizer 84 are adapted without adjustments to the reference levels comprising the signaling alphabet, and decision training or alphabet learning, in which the tap coefficients of the decision feedback equalizer 84 are adapted in parallel with adjustments to the signaling alphabet.

Figure 9:
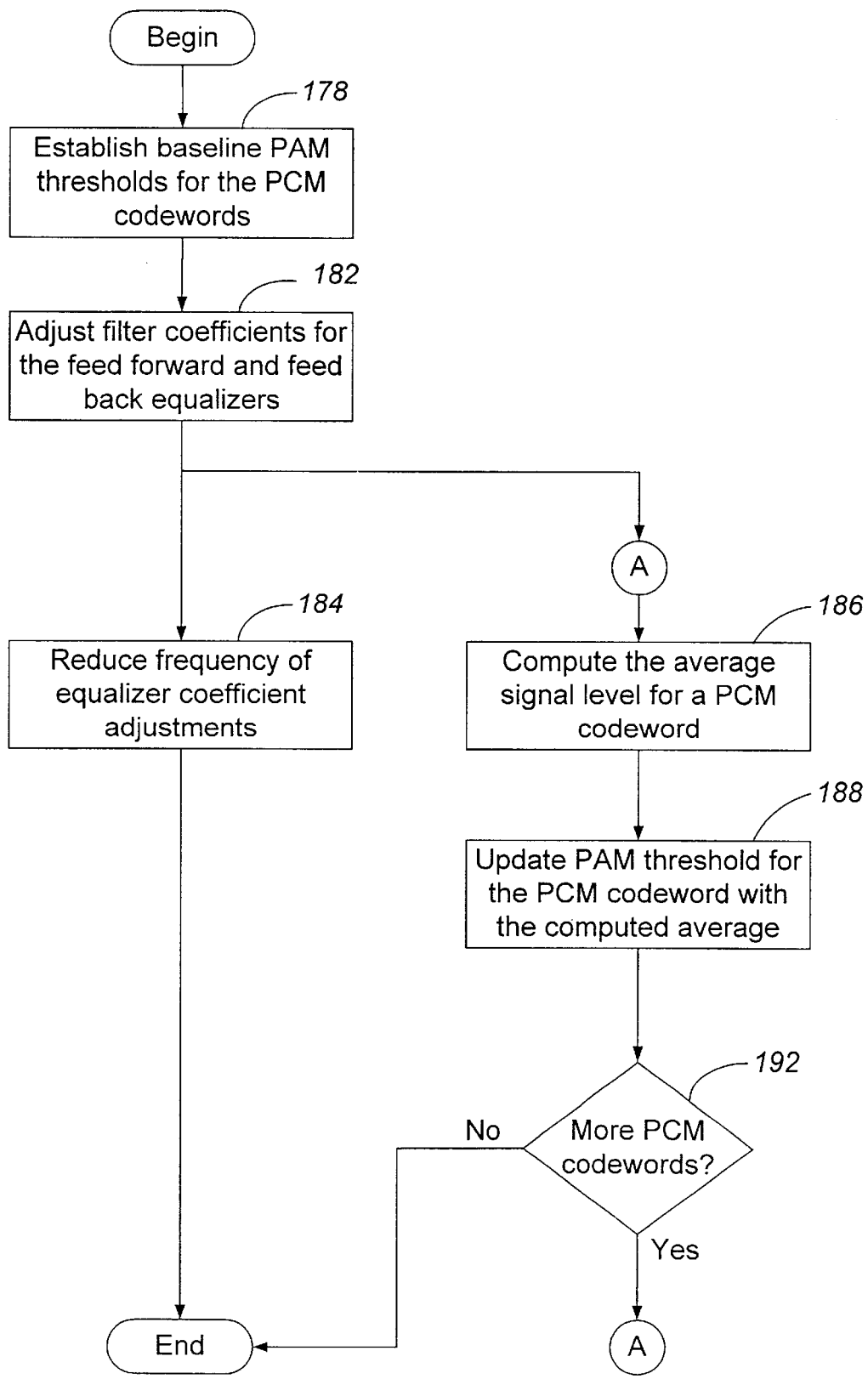
FIG. 9 is a flow chart that illustrates the operation of the decision training program and reference training program of FIG. 8.

Referring now to FIG. 9, the process begins at block 178 where baseline PAM thresholds or reference levels are established for each of the PCM codewords. At block 182, the tap coefficients for the decision feedback equalizer 84 are adjusted during a standard training interval under the control of the reference training program sub-module 166. In cooperation with the decision training program sub-module 164, the frequency of the coefficient adjustment for the decision feedback equalizer 84 is reduced at block 184 while, in parallel, a new signaling alphabet is constructed at the slicer/detector 88.

Each element of the new signaling alphabet is determined by collecting a sufficient number of digital samples from the decision feedback equalizer 84 that are decoded into the same PCM codeword and then computing their average at block 186. This average value is then used as a candidate for the new alphabet member or constellation point for that particular PCM codeword at block 188. A determination is then made at block 192 whether the signaling alphabet has been updated yet for all of the PCM codewords. Blocks 186 and 188 are repeatedly executed until the entire alphabet has been adjusted. The frequency at which the equalizer coefficients are updated is reduced at block 184 to prevent the equalizer training process and the alphabet learning process from working against one another. More specifically, this avoids the condition of the decision feedback equalizer 84 attempting to chase a moving signaling alphabet.

Thus, the improved accuracy in the signaling alphabet reference levels results in a more accurate error signal being fed back to the decision feedback equalizer 84 through the adder 126, which further reduces the mean squared error from the decision feed back equalizer 84.

Advantageously, an identified signaling alphabet can also be used for constructing a signaling alphabet for transmission that pre-compensates for the digital impairments already learned.

Severe Error Detection

Decision feedback equalizers are used in many modem designs because of their ability to provide high SNRs. One drawback to this improved SNR performance, however, is the tendency for the equalizer to become unstable. In particular, incorrect decisions by the slicer/detector 88 due to noise can cause two negative effects: A primary effect is that the errors can propagate for many sampling or modulation intervals after they were made because the errors are repeatedly fed back via the feedback loop. A secondary effect is that the tap coefficients for the decision feedback equalizer 84 filters are pulled away from their desired, steady state, operating points. Moreover, the more dramatic the error, the greater the disturbance to the equalizer coefficients.

Accordingly, the severe error detector 128 under the control of the severe error detector program module 154 provides stability for the decision feedback equalizer 84 under extreme noise conditions that can cause severe errors in the receiver 64.

Figure 10A:
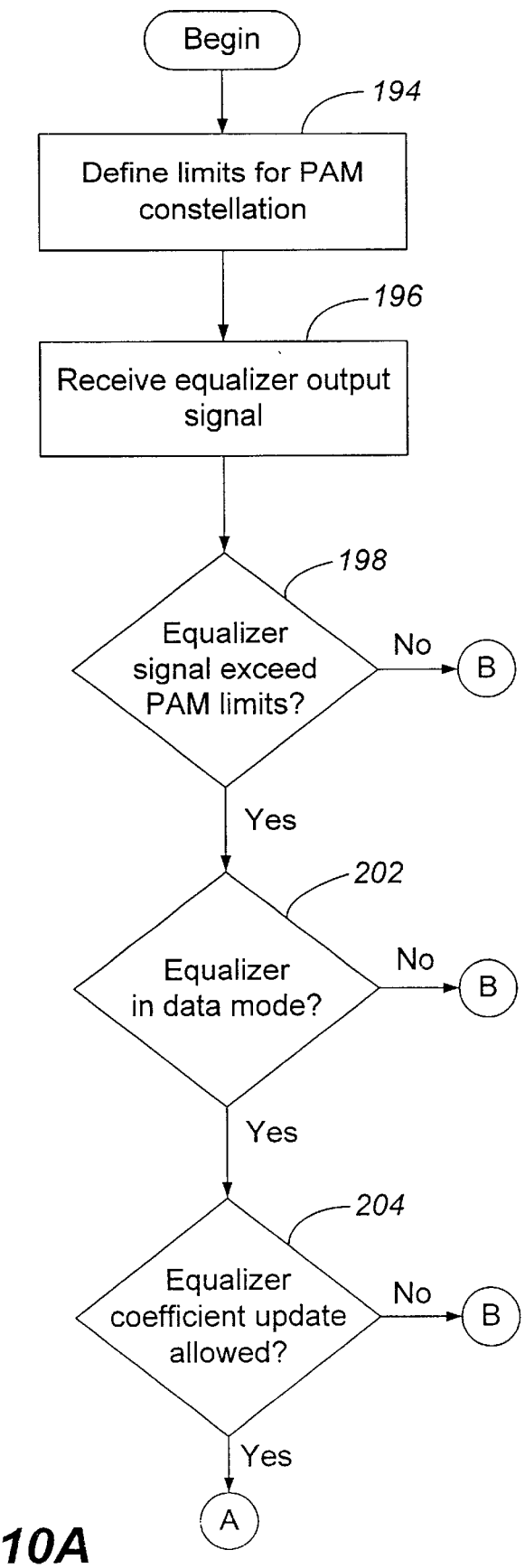
FIGS. 10A–10B are a flow chart that illustrate the operation of the severe error detector program of FIG. 8.
Figure 11:
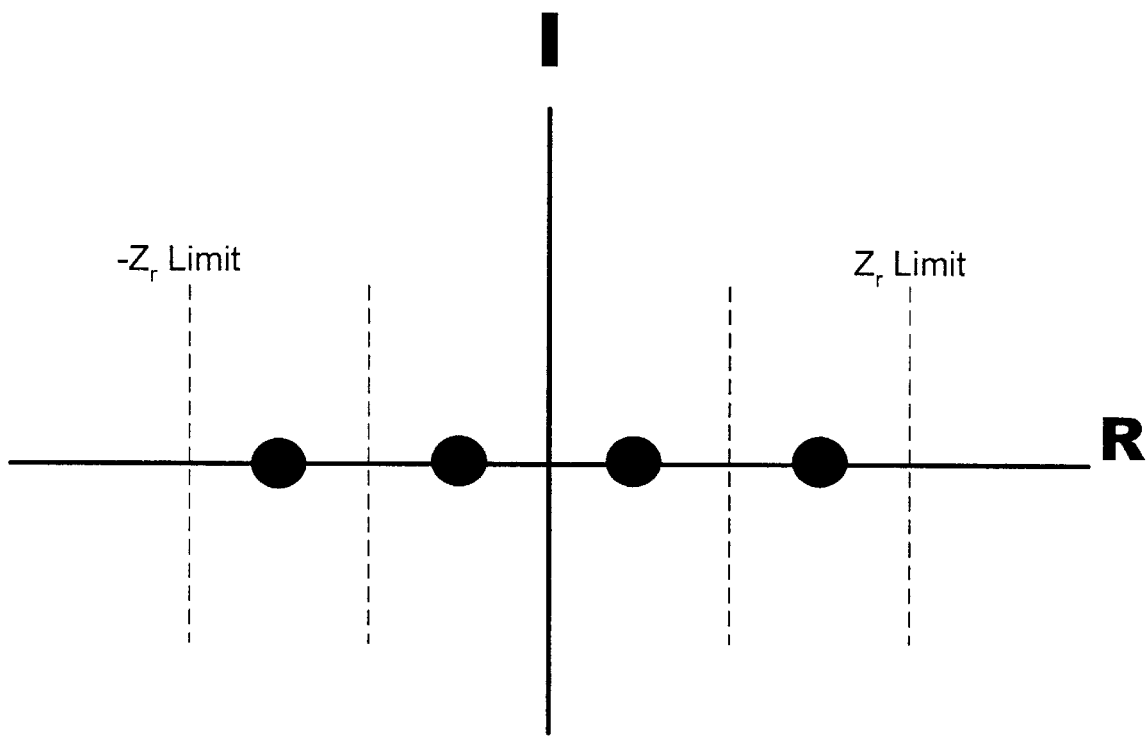
FIG. 11 is a signaling alphabet or constellation point diagram illustrating the boundaries for a severe error as referenced in FIGS. 10A and 10B.

With reference to FIG. 10A, the severe error detector program module 148 defines the maximum limits for valid members of the signaling alphabet (i.e., indexed reference signal levels) or constellation points at block 194. This is illustrated best in FIG. 11 where a constellation diagram is shown in which four ideal reference levels are defined along the real axis. Note that for PAM signaling, all constellation points fall on the real axis unlike QAM signaling in which the constellation points fall in the various quadrants in two-dimensional space. The dashed lines in FIG. 11 represent the decision boundaries used by the slicer/detector 88 in correlating the digital sample from the decision feedback equalizer 84 with a particular constellation point and ultimately a PCM codeword. The two outer boundaries, $Z_r$ Limit and $-Z_r$ Limit, correspond to the outermost points in the constellation plus the value representing one half of the distance between valid constellation points (minus the value representing one half of the distance between valid constellation points for $-Z_r$ Limit). These two boundaries provide the maximum limits for a valid PAM signal.

Figure 10B:
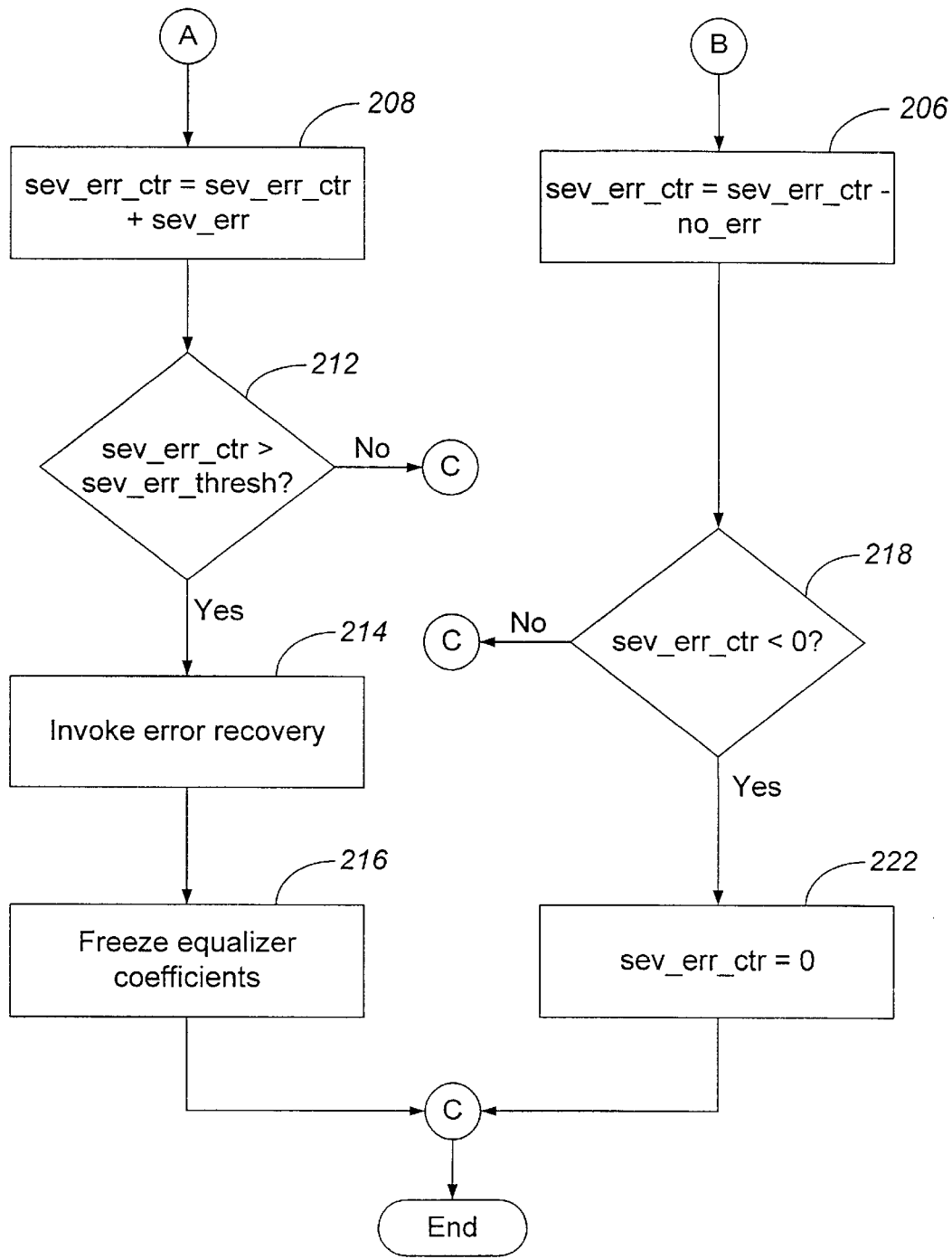

Returning to FIG. 10A, the decision feedback equalizer 84 output signal from the adder 122 is received by the severe error detector 128 at block 196. Three determinations are then made, in no particular order, as represented by blocks 198, 202, and 204. At block 198, a determination is made whether the sample from the decision feedback equalizer 84 exceeds the maximum limits from block 194. A second determination is made at block 202 whether the decision feedback equalizer is in a data transmission mode. Finally, a determination is made at block 204 whether a flag is set that allows the tap coefficients of the decision feedback equalizer 84 to be updated. If the result of any of these three determinations is no, then the process continues by following termination B to block 206 in FIG. 10B. Otherwise, the process continues by following termination A to block 208 in FIG. 10B.

If termination A is followed, then this means that the sample from the decision feedback equalizer 84 exceeds the maximum limits from block 194, which qualifies as a severe error event. Moreover, the decision feedback equalizer 84 is in a data reception mode and updating of the tap coefficients for the decision feedback equalizer 84 is allowed. Accordingly, a severe error counter is incremented by a sev_err constant value in block 208. A determination is made at block 212 if a severe error threshold value has been exceeded. That is, have enough severe error events accumulated to justify taking action to stabilize the decision feedback equalizer 84. If the severe error count has exceeded the threshold value, then error recovery is optionally invoked at block 214 to allow the receiver 64 to drop down to a lower data rate. In addition, the tap coefficients for the decision feedback equalizer 84 are frozen at their current values at block 216 to prevent them from being radically changed due to the out of range PAM samples being received at the slicer/detector 88. Freezing the coefficients at block 216 by setting a flag to the appropriate logic value ensures that future determinations at block 204 are no, as there would be no need to manipulate the severe error counter while the coefficients are frozen.

Conversely, if termination B is followed, then the sample from the decision feedback equalizer 84 is within the range of valid constellation points, the decision feedback equalizer 84 is not in a data transmission mode, or the decision feedback equalizer 84 coefficients are currently frozen. For these cases, the severe error counter is decremented by a no_err constant value at block 206. A check is made at block 218 to determine if the severe error counter drops below zero so that the counter can be reset to zero at block 222 should that occur.

The severe error detector program module program 154 implements a leaky bucket in that as severe errors are detected a counter is incremented according to a first time constant (i.e., the sev_err value). And when valid PAM samples are detected or the decision feedback equalizer 84 is in a mode in which errors are ignored, the counter is decremented according to a second time constant (i.e., the no_err value). The first and second time constants and severe error threshold value used at block 212 are chosen to provide suitable sensitivity to severe errors without thrusting the receiver 64 into error recovery or freezing the tap coefficients too frequently. In a preferred embodiment, the first time constant is set to 50 and the second time constant is set to one. The first time constant can be set heuristically based on the level of memory desired in the circuit that is detecting severe error events. Furthermore, it was found that a value of 200 for the severe error threshold was appropriate for channels that have relatively little passband distortion, and a value of 150 is appropriate for channels with more passband distortion.

The severe error detector 128 and severe error detector program 154 according to the present invention can be particularly useful in certain countries that use metering pulses in their central offices to facilitate call billing. These pulses are typically sent out every 30 to 40 seconds, which can cause a sufficient disturbance to create severe errors for the decision feedback equalizer 84.

It should also be understood that while the severe error detector 128 is described herein in the context of a V.90 modem receiver, the principles are applicable, in general, to any decision feedback equalizer arrangement whether in a modem receiver or other digital signal processing system.

Data Rate Selection

As discussed in the foregoing description of the severe error detector 128 and associated severe error detector program module 154, incorrect decisions by the slicer/detector 88 due to noise can cause catastrophic failure of the decision feedback equalizer 84 as the errors are repeatedly fed back over several demodulation cycles and the tap coefficients are drastically altered from their desired steady state values.

While the severe error detector 128 addressed the problem of samples falling outside of the valid signaling alphabet or constellation, incorrect decoding of samples still within the constellation of valid points also causes the tap coefficients of the decision feedback equalizer 84 to be improperly updated. As can be seen from the simple constellation diagram of FIG. 11, however, reducing the data rate results in elimination of points from the constellation thus increasing the distance between valid points. If the distance between valid constellation points is large enough to encompass the accompanying noise, then the slicer/detector 88 can make a correct decision with regard to the transmitted PAM signal level and the appropriate PCM codeword will be selected. Furthermore, the error vectors fed back to the decision feedback equalizer 84 will be useful for updating the tap coefficients.

Figure 12:
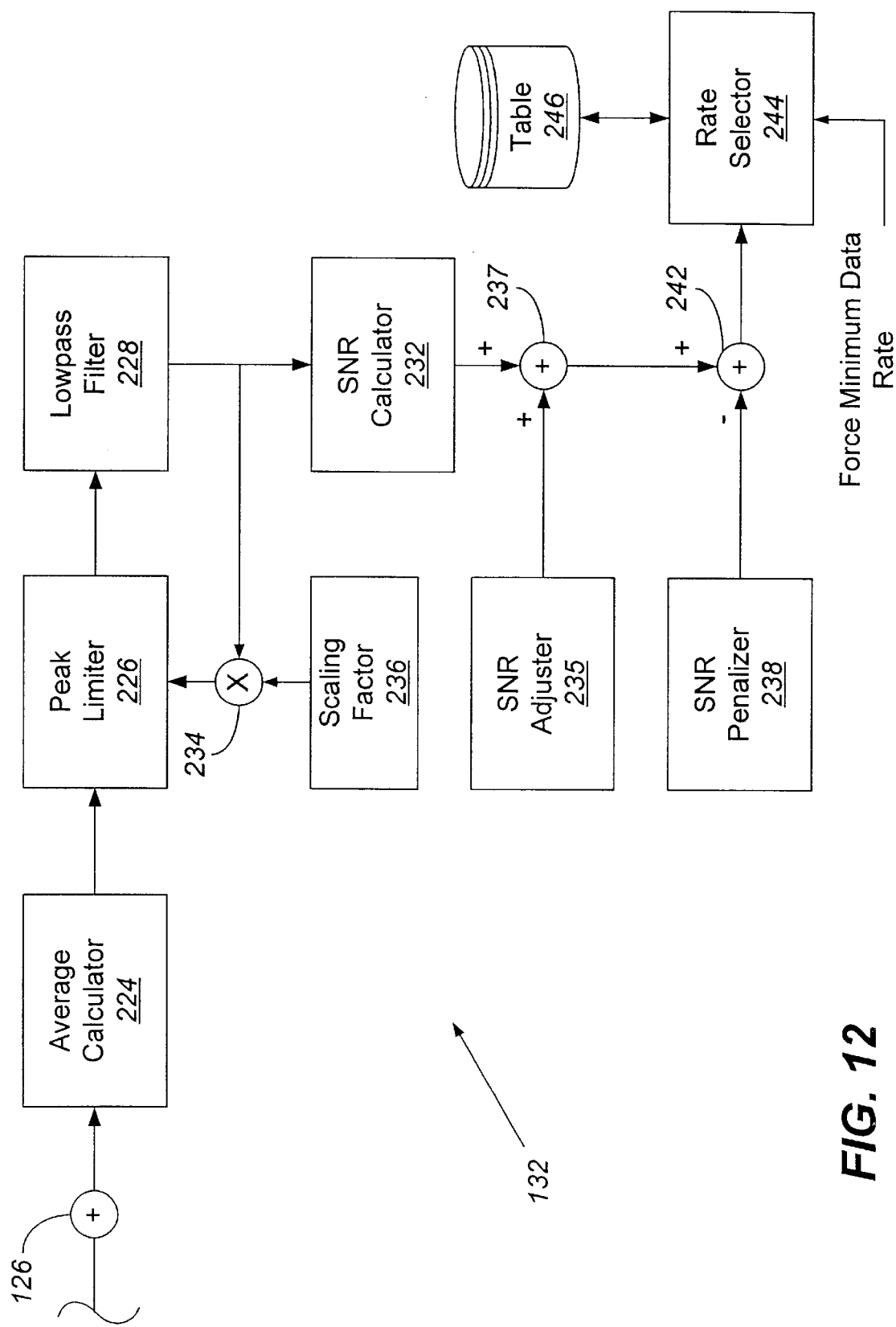
FIG. 12 is a block diagram of the data rate selector of FIG. 4.

The data rate selector 132 and data rate selector program module 146 according to the present invention provide a method for selecting the optimum data rate at which the slicer/detector 88 can make valid decisions, thus preserving the stability of the decision feedback equalizer 84. With reference to FIG. 12, the data rate selector 132 comprises an average error calculator module 224 that computes the average error value for a block of N samples from the adder 126. The output from the average calculator module 224 is received by a peak limiter module 226 to lessen the impact of short error bursts. After the average error has been peak limited, it is filtered by a low pass filter 228. The low pass filter 228 removes the effect of sharp variations in the average error due to noise bursts of short duration. The output from the low pass filter 228 is provided to both an SNR calculator module 232 and to a multiplier 234, which feeds back the filtered output multiplied by a scaling factor 236 to the peak limiter module 226. In a preferred embodiment of the present invention, a scaling factor of two is used to peak limit the average error to twice the current value as output from the low pass filter 228.

The SNR calculator module 232 calculates the SNR using the average error value output from the low pass filter 228. The SNR is defined as set forth below in Equation 4:

$$SNR = 10 \log_{10}(\text{Signal power}/\text{Noise power}) \qquad \text{EQ. 7}$$

In a specific, fixed-point implementation of a preferred embodiment of the present invention, it can be shown that, through normalization, Equation 4 can be rewritten below as Equation 5:

$$SNR = 10 \log_{10}(2^{15}/(LPF\_error/2^{16})) \qquad \text{EQ. 8}$$

where LPF_error is the average error output from the low pass filter 228.

The SNR value from the SNR calculator module 232 is combined with an SNR adjustment from an SNR adjuster module 235 in an adder 237. The SNR value output from the adder 237 is then optionally combined with a penalty value from an SNR penalizer module 238 in an adder 242. This final SNR value output from the adder 242 is used by a rate selector module 244 to index a table containing data rate values associated with SNR values. The data rate associated with the SNR value from the rate selector module 244 can be used by the receiver 64 to run substantially error free assuming the entries in the table 246 have been selected properly. Under certain line conditions, the data rate selection based on the SNR can be overridden and the data rate forced to a minimum default value.

Figure 13A:
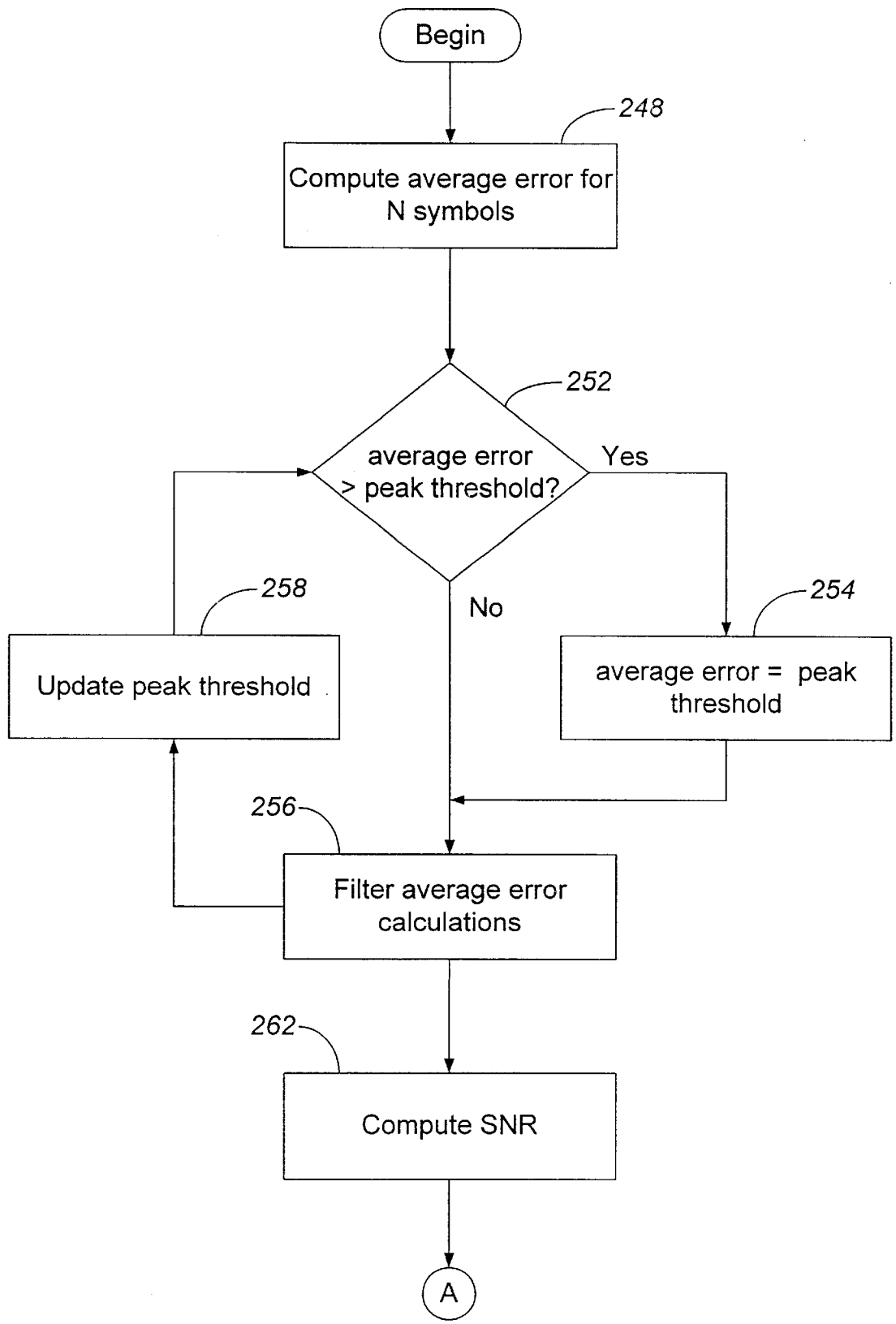
FIGS. 13A–13B are a flow chart that illustrate the operation of the data rate selector program of FIG.8.
Figure 13B:
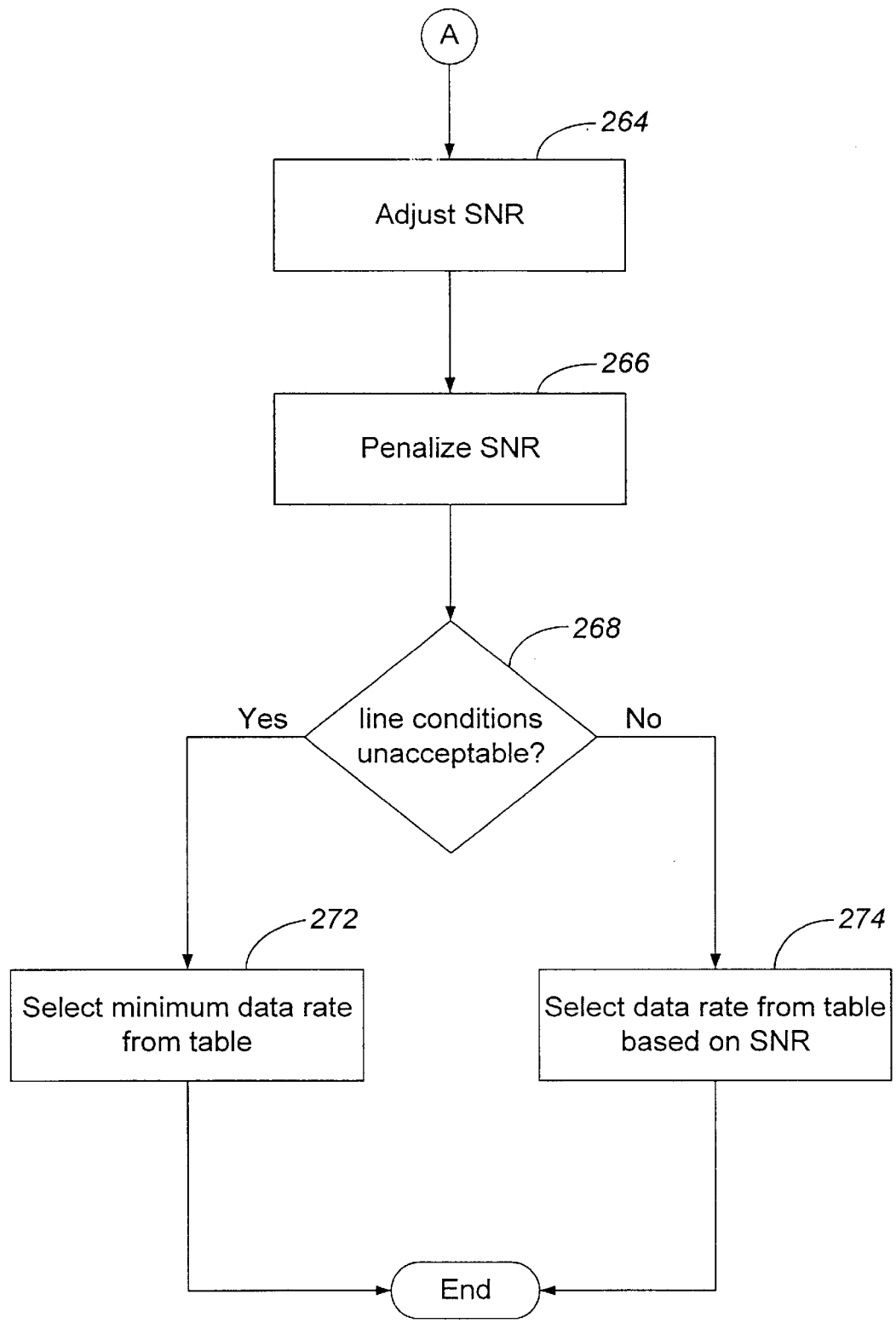

The operation of the data rate selector 132 and the data rate selector program module 146 is described hereafter with reference to FIGS. 13A and 13B. The data rate selection process begins at block 248 where the average error calculator module 224 computes the average error for N PCM symbols. A determination is made at block 252 whether the average error has exceeded the peak threshold value. If the peak limit has been exceeded, then the peak limiter module 226 will limit the average error to the peak threshold value at block 254 before low pass filtering the average error at block 256. This filtered average error value is used to set the new peak threshold value for the subsequent iteration of the process as represented by block 258. Recall from the discussion of the peak limiter module 226 of FIG. 12 that the peak threshold value may be set to twice the current filtered average error value from the low pass filter 228 in a preferred embodiment of the present invention.

The SNR is computed by the SNR calculator module 232 at block 262 using the average error value from the low pass filter 228 as discussed hereinbefore. Following termination A to FIG. 13B, the process continues at block 264 where an adjustment is made to the computed SNR value. During startup, the SNR is adjusted upward by adding a bonus amount to the SNR value. This boost provides the decision feedback equalizer 84 with more time to eventually converge to a higher SNR than would have been reached had the bonus amount not been added. Over time, this bonus amount is subtracted from the SNR at block 264 as the calculated SNR naturally rises to its final value. Essentially, the SNR adjustment block 264 provides a mechanism for the data rate selector program 146 to anticipate a final, steady state SNR and to improve the performance of the receiver 64 during the interim time taken for the SNR to reach this final value.

A penalty amount is subtracted from the adjusted SNR value at block 266 based on the number of errors incurred as defined by, for example, the V.42 recommendation from the ITU that defines error control procedures on analog circuits. This penalty amount can also be entered through the communication interface 142 of the V.90 modem 60 by an operator using the attention code AT command set. An operator can thereby control how aggressive the modem 60 will be in attempting to connect at the maximum possible data rate based on the SNR.

If the line conditions are unacceptable as determined at block 268, then the data rate selection process based on the SNR is bypassed and a connection is established at a minimum data rate at block 272. The minimum data rate that is used as a default can be stored in the table 246, held elsewhere in the memory 136, or stored in another location accessible by the data rate selector program module 146. An example of a line condition that could force a selection of the minimum data rate is if there is ambiguity in detecting the influence of PADs in the communication path.

If the line conditions are acceptable, then the data rate is selected from the table 246 at block 274 by using the SNR value as an index or key to retrieve a data rate associated with that SNR value. The table 246 is constructed through experimentation in which the data rate is increased for a given SNR value until errors are incurred at the receiver 64.

In addition to using the table for data rate selection, it may also be useful to relate the SNR to the spacing between points in the PAM signaling alphabet or constellation. This spacing ultimately translates into an allowable data rate in the client modem 60 because, for a fixed power level, a closer spacing results in more usable points in the constellation.

The following equations are derived based on a V.90 implementation in which a server modem encodes data for transmission to the client modem 60 in a data frame comprising a six-symbol structure. Each symbol position within the data frame is called a data frame interval. These equations can be implemented by program logic in the data rate selector program module 146 in accordance with the present invention.

An upper bound for the probability of error, $P_e$, based on a minimum spacing, $d_{min}$, between constellation points is given by Equation 9 below:

$$P_e \leq \frac{1}{6}\sum_{i=0}^{5}\sum_{m=0}^{M_i-1} 2Q\left(\frac{d_{min}}{2\sigma}\right)\frac{n_{i,m}}{2^K} \qquad \text{EQ. 9}$$

where $M_i$ is equal to the number of positive levels in the constellation to be used in a data frame interval i, $n_{i,m}$ is equal is the frequency of occurrence of the signal level indexed by m in interval i, K is the number of bits encoded by the server modem in the data frame, and Q(x) is the area under the tail of the Gaussian probability density function, which is defined by Equation 10:

$$Q(x) = \frac{1}{\sqrt{2\pi}}\int_{x}^{\infty} e^{-t^2/2}\,dt, \quad x \geq 0 \qquad \text{EQ. 10}$$

After performing some algebraic simplification, the upper bound on the probability of error, $P_e$, can be rewritten as Equation 11:

$$P_e \leq 2Q\left(\frac{d_{min}}{2\sigma}\right) \qquad \text{EQ. 11}$$

To obtain a lower bound on the probability of error, $P_e$, the minimum and maximum spacing between constellation points are defined in Equations 12 and 13, respectively, as follows:

$$d_{min,i} = \min\{d_{i,m}\}, 0 \leq m \leq M_i-1 \qquad \text{EQ. 12}$$

$$d_{max,i} = \max\{d_{min,i}\}, 0 \leq i \leq 5 \qquad \text{EQ. 13}$$

A lower bound for the probability of error, $P_e$, is thus given by Equation 14:

$$P_e \geq \frac{1}{6}\sum_{i=0}^{5}\sum_{m=M_i-c_i}^{M_i-1} 2Q\left(\frac{d_{max}}{2\sigma}\right)\frac{n_{i,m}}{2^K} \qquad \text{EQ. 14}$$

where $c_i$ is the number of points at the minimum spacing distance. Note that the smallest index value (m=0) corresponds to the largest signal level in the constellation while the largest index value ($m=M_i-1$) corresponds to the smallest signal level in the constellation.

After performing some algebraic simplification to separate a constant term, $C_L$, the lower bound on the probability of error, $P_e$, can be rewritten as Equation 15:

$$P_e \geq C_L Q\left(\frac{d_{max}}{2\sigma}\right) \qquad \text{EQ. 15}$$

where $$C_L = \frac{1}{6}\sum_{i=0}^{5}\sum_{m=M_i-c_i}^{M_i-1}\frac{n_{i,m}}{2^{K-1}} \qquad \text{EQ. 16}$$

By combining Equations 11 and 15, the bounds on symbol error probability can be expressed as follows in Equation 17:

$$C_L Q\left(\frac{d_{max}}{2\sigma}\right) \leq P_e \leq C_U Q\left(\frac{d_{min}}{2\sigma}\right) \qquad \text{EQ. 17}$$

where $C_U=2$.

For given values of $d_{min}$ and $P_e$, the upper bound on the mean squared error at the output of the decision feedback equalizer 84, which is based on the error signal generated by the adder 126 (see FIG. 4), is given by Equation 18:

$$\sigma^2 \leq \frac{d_{min}^2}{4Q_{inv}^2\left(\frac{P_e}{C_U}\right)} \qquad \text{EQ. 18}$$

where $Q_{inv}$ is the inverse of Q(x) defined above. Similarly, the lower bound on the mean squared error at the output of the decision feedback equalizer 84 is given by Equation 19:

$$\sigma^2 \geq \frac{d_{max}^2}{4Q_{inv}^2\left(\frac{P_e}{C_L}\right)} \qquad \text{EQ. 19}$$

The mean squared error from Equations 18 and 19 can be used in Equation 8 to generate upper and lower bounds for the SNR for a specific error probability and minimum spacing between constellation points in the PAM signaling alphabet. Likewise, for a given SNR or mean squared error at the output of the decision feedback equalizer 84, the minimum spacing between constellation points can be obtained based on the error probability, which translates into a corresponding data rate.

Tone Reversal Detection During Startup

The V.90 recommendation specifies that in phase two of the startup protocol, the client modem 60 shall transmit a tone A, followed by a phase reversal of the tone A, which is followed by a second phase reversal of the tone A (i.e., the original tone A) to the server modem 102. The server modem 102 uses the events of receiving the first and second phase reversals of tone A to calculate the round trip delay between the server modem 102 and the client modem 60. Because of delays inserted by both the server modem 102 and the client modem 60, the elapsed time between detection of the first tone A phase reversal and the second tone A phase reversal should never be less than approximately 80 ms. Unfortunately, the V.90 recommendation provides no error recovery procedure should the server modem 102 detect a second tone A phase reversal within 80 ms as a result of noise or the client modem 60 transmitting the second tone A phase reversal prematurely.

The tone reversal detection program module 174 in accordance with the present invention provides a procedure for recovering from a prematurely detected tone A phase reversal. It should be noted that the principles discussed hereafter with respect to tone reversal detection in a V.90 communication session are equally applicable to V.34. In a V.34 session, however, the roles of the client modem 60 and server modem 102 are typically reversed. Thus, for a V.34 implementation in which the round trip delay is calculated based on the first and second phase reversals of tone A, the tone reversal detection program module 174 typically resides at the client modem 60 as shown in FIG. 8. In a V.90 session in which the round trip delay is calculated based on the first and second phase reversals of tone A, the tone reversal detection program module 174 would typically reside at the server modem 102. Nevertheless, it should be further understood that both the V.90 and the V.34 recommendations provide for the calculation of the round trip delay at both the server modem 102 and the client modem 60. The tone reversal error recovery procedure according to the present invention is described first in the context of the round trip delay calculation being performed at the server modem 102 for V.90 and at the client modem 60 for V.34.

Figure 14A:
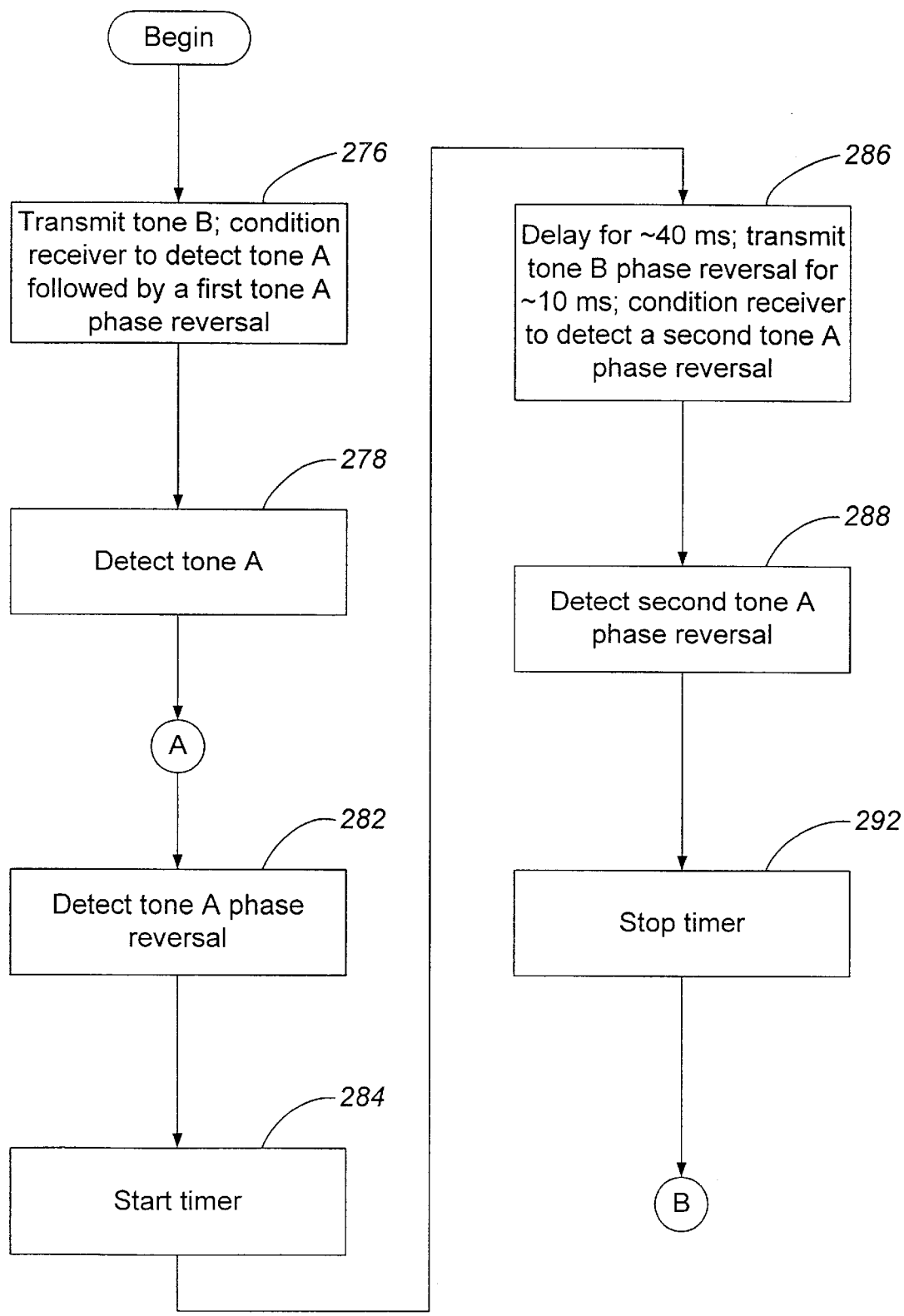
FIGS. 14A–14B are a flow chart that illustrate the operation of the tone reversal detection program of FIG. 8.
Figure 14B:
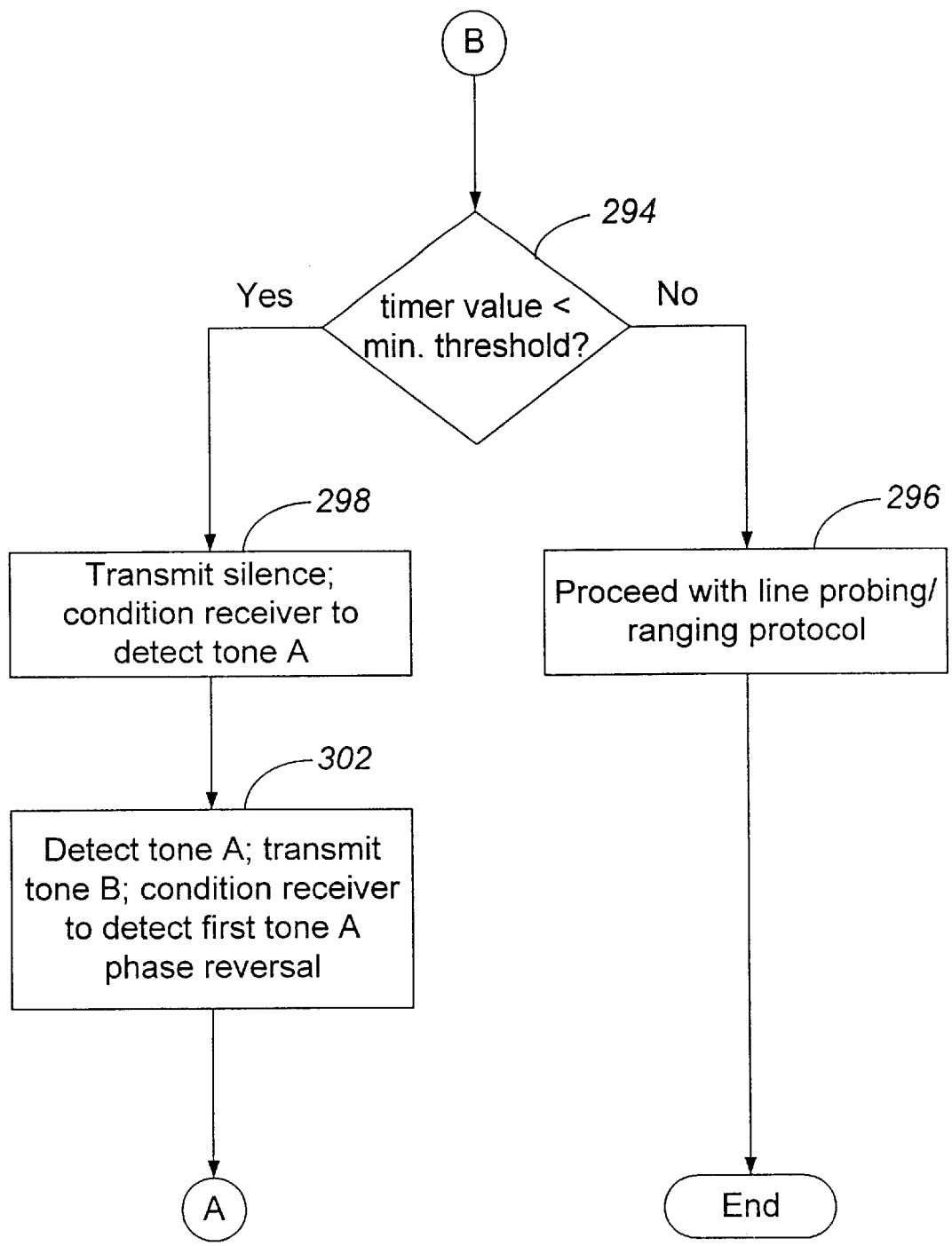
Figure 15:
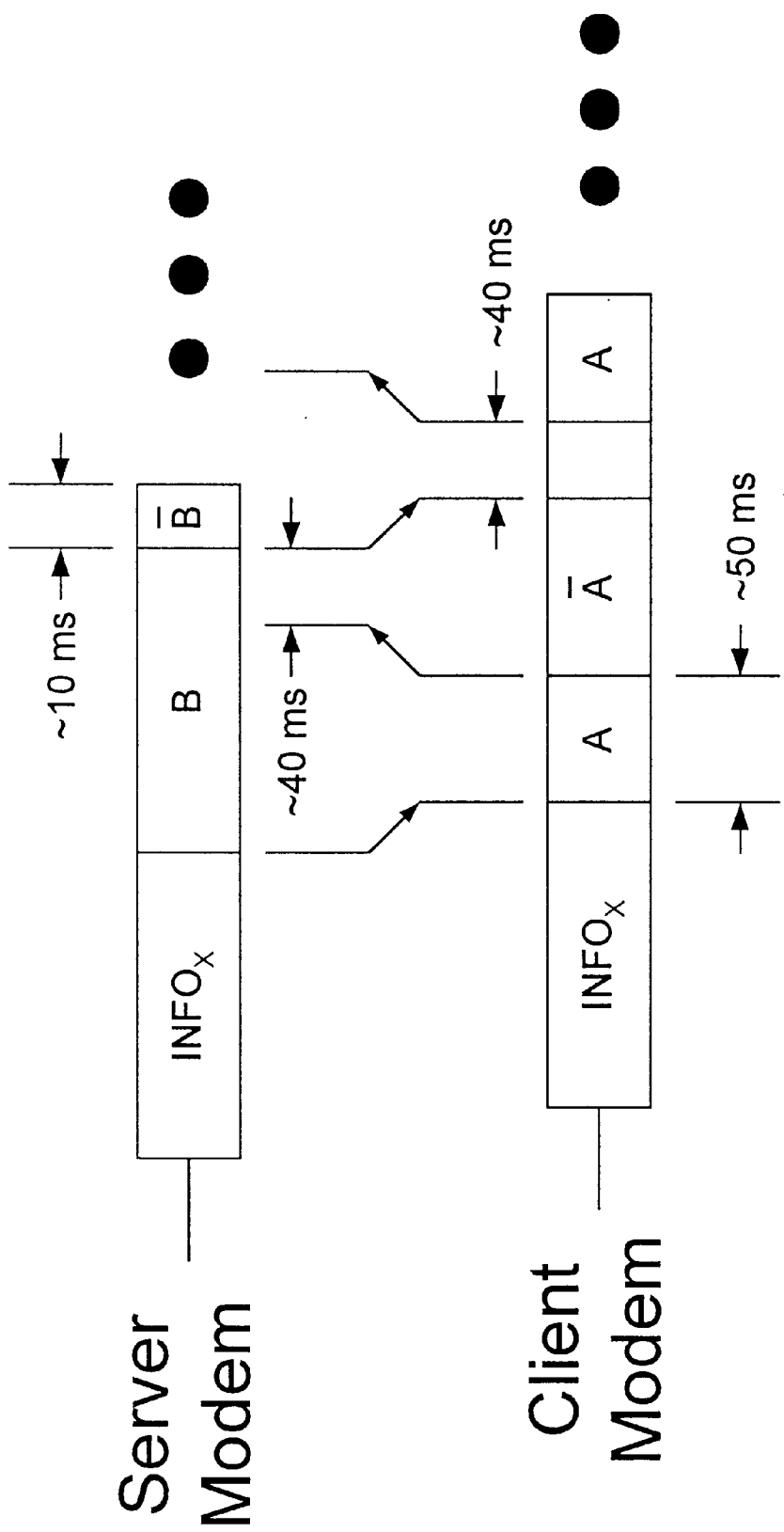
FIG. 15 is a tone sequencing diagram illustrating the exchange of tones and messages between a server modem and a client modem as part of the tone reversal detection described in FIGS. 14A–14B.
Figure 16:
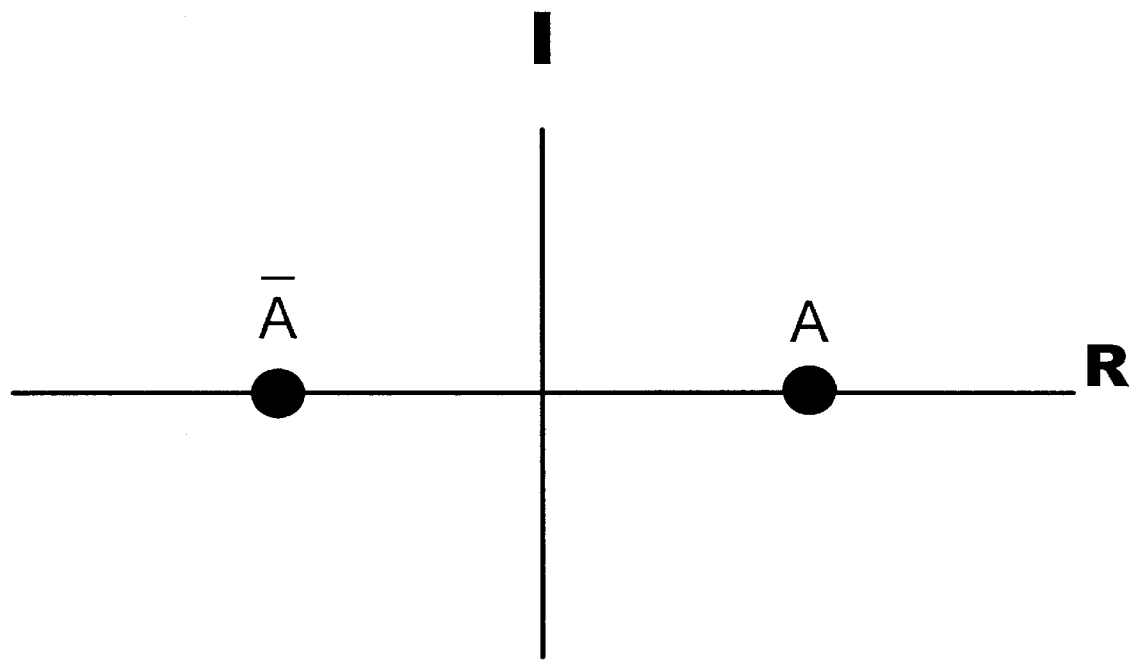
FIG. 16 is a constellation diagram depicting a tone and a phase reversal of the tone as referenced in FIGS. 14A, 14B, and 15.

The tone reversal error recovery procedure is described hereafter with reference to the flow charts of FIGS. 14A and 14B, and the tone sequencing diagram of FIG. 15. Referring now to FIG. 14A, the process begins at block 276 where the server modem 102, under the control of the tone reversal detection program module 174, transmits a tone B to the client modem 60 and conditions its receiver to detect tone A followed by a phase reversal of tone A. FIG. 16 illustrates the difference between tone A and a phase reversal of tone A. A phase reversal of tone A is tone A shifted 180° on the complex plane. After detecting tone A at block 278 and a subsequent tone A phase reversal at block 282, a timer is started or a timestamp is recorded at block 284. The server modem 102 delays for approximately 40 ms, as shown in FIG. 15, at which time the server modem 102 transmits a phase reversal of tone B and conditions its receiver to detect a second phase reversal of tone A (i.e., the original tone A) at block 286.

When the client modem 60 receives the tone B phase reversal sent from the server modem 102, it will delay approximately 40 ms before sending a second tone A phase reversal to the server modem 102 as shown in FIG. 15. After detecting the second tone A phase reversal at block 288, the server modem 102 stops the timer or records a second timestamp at block 292. Following termination B to FIG. 14B, a determination is made at block 294 whether the timer value is less than a minimum threshold value. As illustrated in FIG. 15, the difference in the timer or timestamp values between blocks 292 and 284 should equal the round trip delay plus 80 ms due to the 40 ms delay by the server modem 102 upon receiving the first tone A phase reversal plus a second 40 ms delay by the client modem 60 upon receiving the tone B phase reversal. Thus, the timer value should never be less than approximately 80 ms in theory, but to account for minor variations in modem operations, a minimum threshold value of approximately 70 ms is used in a preferred embodiment of the present invention.

If the timer value exceeds the minimum threshold value, then the round trip delay can be reliably calculated and phase two (line probing/ranging) of the startup protocol continues at block 296. Otherwise, if the timer value is less than the minimum threshold value, then a premature detection of the second tone A phase reversal has occurred. In that instance, the server modem 102 inhibits the transmission of tone B (i.e., prevents the acknowledgement that the second tone A phase reversal was properly received) to the client modem 60 and conditions its receiver to detect tone A at block 298. The client modem 60 will eventually transmit tone A where it is detected at the server modem 102. The server modem 102 then transmits tone B and conditions its receiver to detect a first phase reversal of tone A at block 302. The tone reversal sequence continues by following termination A to block 282 of FIG. 14A.

Thus, the tone reversal detection program module 174 provides a procedure for detecting premature instances of the second tone A phase reversal, which, left undetected, could cause the communication session between the server modem 102 and the client modem 60 to breakdown further into the multi-phase startup protocol.

It should be understood that the operation of the tone reversal detection program module 174 described hereinabove pertains to a preferred implementation that is compliant with the V.90 and V.34 recommendations. That is, an implementation in which round trip delay is calculated at the server modem 102 in V.90 and the client modem 60 in V.34. Nevertheless, an alternative implementation of the tone reversal detection program module 174 can allow the round trip delay to be calculated at the client modem 60 in V.90 and the server modem 102 in V.34.

In this alternative implementation, the exchange of tones between the server modem 102 and the client modem 60 remains the same as shown in FIG. 15. The tone reversal detection program module 174 resides at the client modem 60 (i.e., a V.90 alternative implementation), however, for calculating the round trip delay. Specifically, a timer is started or a timestamp is recorded by the tone reversal detection program module 174 at the client modem 60 upon transmitting tone A in response to receiving tone B from the server modem 102. The client modem 60 transmits tone A for approximately 50 ms and then transmits a phase reversal of tone A. Upon receiving the tone A phase reversal, the server modem 102 delays for approximately 40 ms and then transmits a phase reversal of tone B. When the tone B phase reversal is detected at the client modem 60, the timer is stopped or a second timestamp is recorded. The difference in timer or timestamp values should equal the round trip delay plus 90 ms. Thus, the timer value should never be less than approximately 90 ms in theory, but to account for minor variations in modem operations, a minimum threshold value of approximately 80 ms is preferably used.

If the timer value exceeds the minimum threshold value, then the round trip delay can be reliably calculated. Otherwise, if the timer value is less than the minimum threshold value, then a premature detection of the tone B phase reversal from the server modem 102 has occurred. In this instance, the client modem 60 inhibits transmission of the second tone A phase reversal (i.e., prevents the acknowledgment that the tone B phase reversal was properly received) and conditions its receiver to receive tone B. Upon detecting tone B, the client modem transmits tone A for approximately 50 ms and the process repeats as discussed in the foregoing.

Advantageously, the tone reversal detection program module 174 in accordance with the present invention can be used to reliably calculate the round trip delay from either end of both a V.34 communication session and a V.90 communication session.

Abnormal Line Condition Detection and Data Rate Fall Back

One of the characteristics of V.90 communication is that the communication path from the server modem 102 to the central office servicing the client modem 60 is typically digital. That is, the only A/D conversion in the entire path between the server modem 102 and the client modem 60 is at the client modem 60 itself. Any extra A/D conversions in the path downstream from the server modem 102 may result in digital discontinuity and may prevent establishment of a V.90 connection. In addition to digital discontinuity, other characteristics of the communication path could also prevent the establishment of a V.90 connection. For example, the PAM signal could be severely attenuated by the local loop connecting the client modem 60 to the central office. Alternatively, the local loop could exhibit a non-linear frequency response, which would result in an abnormally low SNR in the client modem receiver 64 that would not support V.90 reception.

The abnormal line condition detection program module 176 provides a procedure for detecting the aforementioned irregularities (i.e., abnormal line conditions) using the results from the line probing performed as part of the phase two startup procedures. If these irregularities are detected, then the client modem 60 can choose to fall back to a lower data rate protocol, such as V.34, at the end of phase two rather than waiting for the connection to fail during a later phase.

Figure 17A:
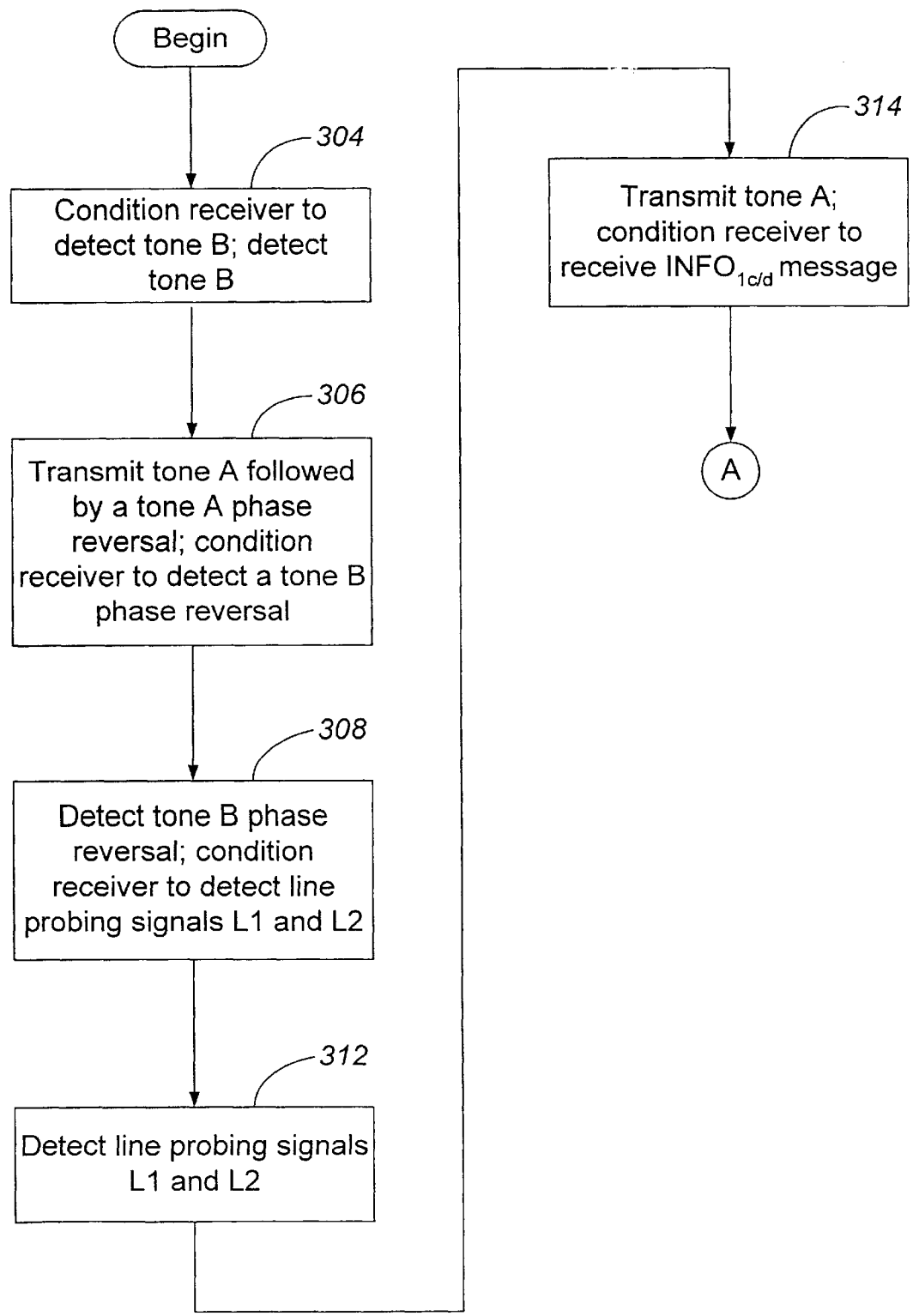
FIGS. 17A–17C are a flow chart that illustrate the operation of the abnormal line condition detection program of FIG. 8.
Figure 18:
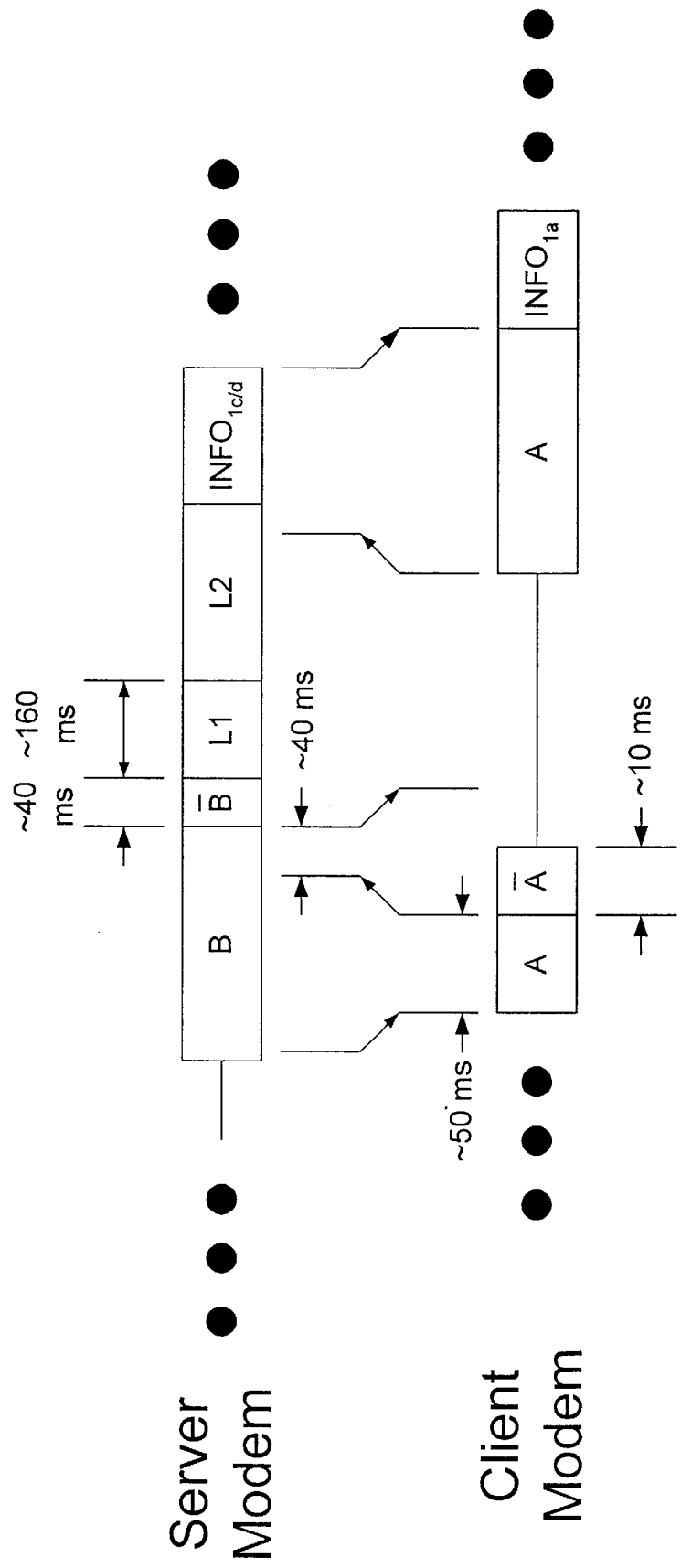
FIG. 18 is a tone sequencing diagram illustrating the exchange of tones and messages between a server modem and a client modem as part of the abnormal line condition detection described in FIGS. 17A–17C.

Referring now to FIG. 17A and the tone and message sequence diagram of FIG. 18, the process begins at block 304 where the client modem 60 conditions its receiver 64 to detect tone B and subsequently detects tone B transmitted from the server modem 102. The client modem 60 then transmits tone A followed by a tone A phase reversal after which it conditions its receiver to detect a tone B phase reversal at block 306. The tone B phase reversal is detected at the client modem 60 at block 308 after which the client modem 60 conditions its receiver to detect the line probing signals L1 and L2. The line probing signals L1 and L2 are periodic signals that consist of a set of tones spaced 150 Hz apart and ranging from 150 Hz to 3750 Hz.

The line probing signals L1 and L2 are detected by the client modem 60 at block 312. The client modem 60 then transmits tone A to the server modem 102 and conditions its receiver to receive an $INFO_{1d}$ message at block 314. If the modems were attempting to establish a V.34 connection from the beginning and falling back to a lower data rate within the V.34 protocol, then the procedure remains identical except that an $INFO_{1c}$ message is used in the alternative. The $INFO_{1c/d}$ messages contain information regarding power reduction at the server modem 102 transmitter, details regarding pre-emphasis filters used at the server modem 102 transmitter, and other information for the client modem 60.

Figure 17B:
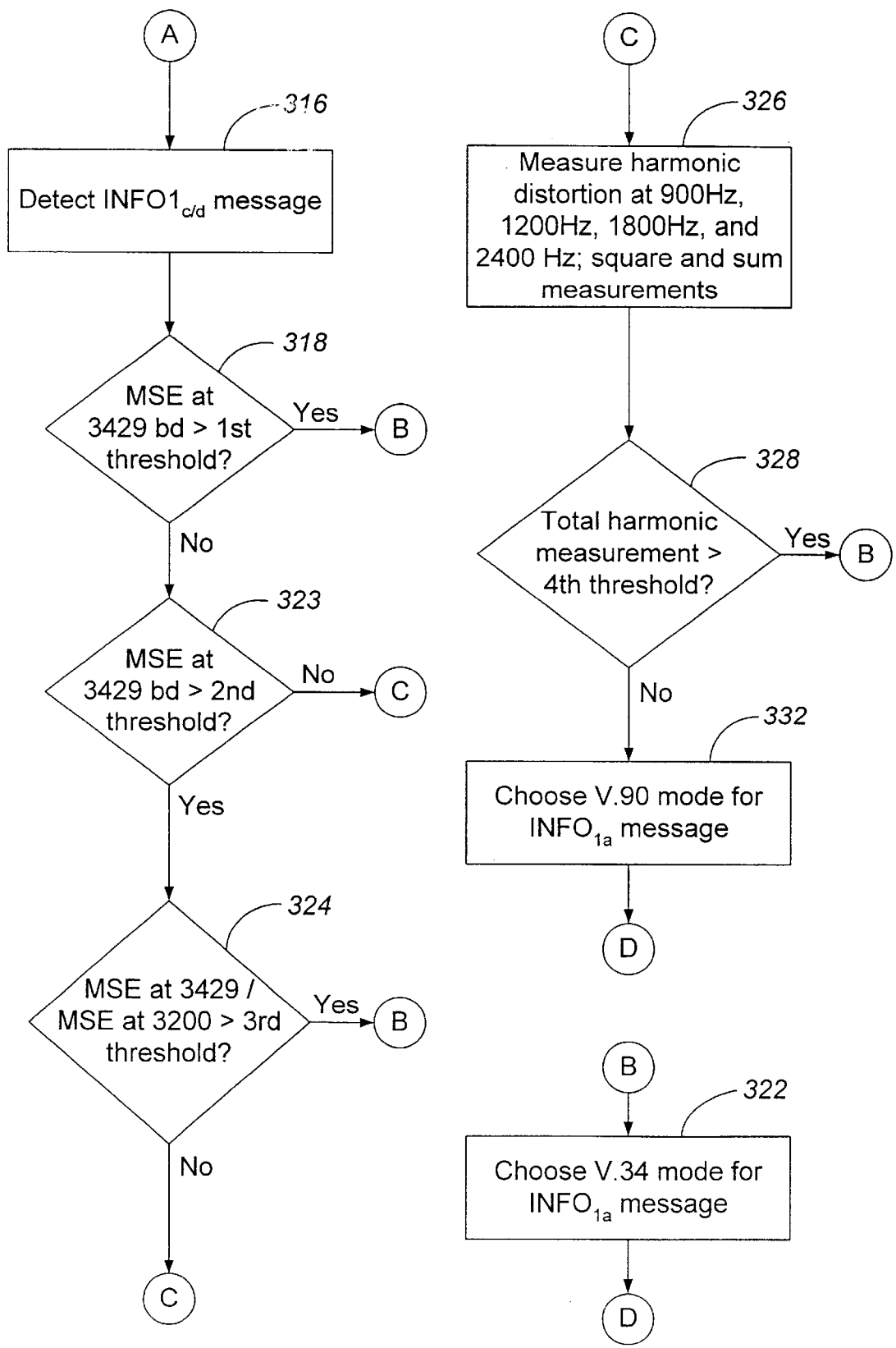

Following termination A to FIG. 17B, the client modem 60 detects the $INFO_{1c/d}$ message from the server modem 102 at block 316. The client modem 60 then calculates the minimum mean-square-error (MSE) at the receiver 64 for the 3429 symbol per second rate based on an evaluation of the line probing signals L1 and L2 detected at block 312. The minimum MSE is calculated by comparing the frequency response curve of the analog loop with an ideal response to determine if the loop attenuation is too great to support V.90 communication. If the minimum MSE is greater than a first threshold value as determined at block 318, then termination B is followed to block 322 where the V.34 mode will be chosen (or a lower data rate if the modems are currently attempting to establish a V.34 connection) as a fall back data rate.

To check for digital discontinuity in the communication path, the MSE at 3429 baud is first compared with a second threshold value at block 323. The second threshold value is less than the first threshold value used in the comparison made at block 318. If this second threshold value is exceeded, then a second test is performed at block 324 in which the minimum MSE is computed for the 3200 symbol per second rate and the ratio of the MSE at 3429 baud and the MSE at 3200 baud is compared to a third threshold value. If this third threshold value is exceeded, then termination B is followed to fall back to a lower data rate protocol.

If the comparisons made at blocks 318, 323 and 324 fail to detect either severe attenuation or digital discontinuity, then at block 326 the harmonic distortion is measured at 900 Hz, 1200 Hz, 1800 Hz, and 2400 Hz. These four frequencies are excluded from the L1 and L2 probing signals thereby allowing the client modem 60 to use the harmonic distortion measurement at these frequencies as an indicator of non-linearity in the local loop. The harmonic distortion at the aforementioned frequencies is squared and summed to create a total harmonic measurement that is then compared with a fourth threshold value at block 328. If the fourth threshold value is exceeded, then termination B is followed to fall back to a lower data rate protocol.

Figure 17C:
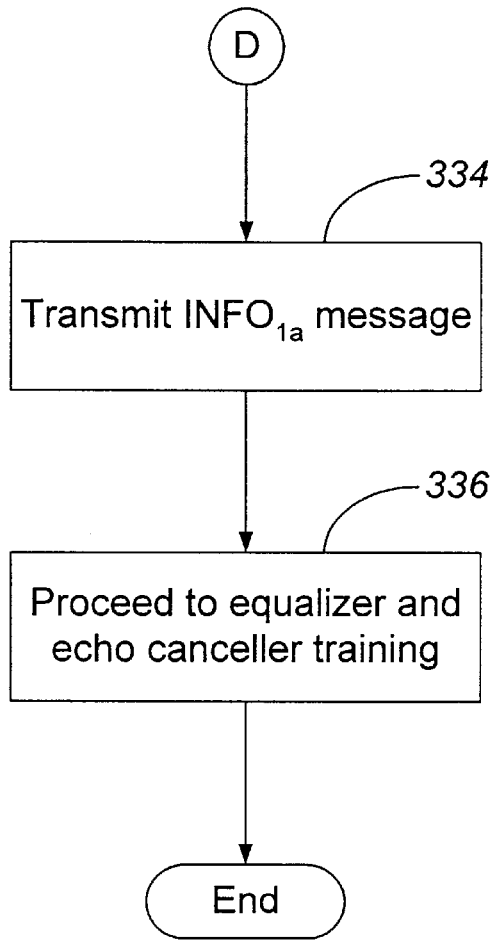

If the tests performed at blocks 318, 324, and 328 fail to detect any abnormal line conditions, then the V.90 mode is chosen at block 332. Following termination D to FIG. 17C, the client modem 60 transmits the $INFO_{1a}$ message at block 334 with the appropriate bits set according to whether V.90 mode was chosen at block 332 or V.34 mode was chosen at block 322. Similarly, if the modems were attempting to establish a V.34 connection originally, then the fall back rate could be to a low data rate in accordance with the V.34 protocol. The server modem 102 and the client modem 60 then proceed to the subsequent phase in the startup procedure at block 336, which involves equalizer and echo canceller training. If the line conditions have necessitated a fall back to V.34, then the subsequent phases of the startup procedure will be executed in accordance with the V.34 recommendation. Conversely, if the line condition will support a V.90 connection, then the subsequent phases of the startup procedure will be executed in accordance with the V.90 recommendation.

Advantageously, the abnormal line condition detection program module 176 in accordance with the present invention provides a procedure for detecting abnormal line conditions that will ultimately prevent the establishment of a V.90 connection early in the startup procedure. As a result, the server modem 102 and the client modem 60 can immediately fall back to a lower data rate protocol and continue with the startup procedure for the lower data rate protocol. This early fall back procedure is more reliable and efficient than proceeding to later phases in the startup procedure in accordance with the higher data rate protocol only to be forced to fall back later and repeat phases for the lower data rate protocol that were needlessly performed for the higher data rate protocol.

The flow charts of FIGS. 9, 10A–10B, 13A–13B, 14A–14B, and 17A–17C show the architecture, functionality, and operation of a possible implementation of the client modem receiver 64 software. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

We claim:

1. A method for selecting a data rate in a modem based on a plurality of error signals, each error signal representing the difference between an output of an equalizer module and an output of a detector module, comprising the steps of:
   computing an average error value from the plurality of error signals;
   determining a signal to noise ratio using the average error value;
   selecting the data rate based on the signal to noise ratio;
   limiting the average error value to a maximum threshold to generate a limited average error value; and
   filtering the limited average error value through a low pass filter to generate a filtered limited average error value;
   wherein the determining step comprises the step of determining a the signal to noise ratio using the filtered limited average error value.

2. A method as recited in claim 1, further comprising the step of: multiplying the filtered limited average error value by a scaling factor.

3. A method as recited in claim 2, wherein the maximum threshold is equal to the filtered limited average error value multiplied by the scaling factor.

4. A method as recited in claim 3, wherein the scaling factor is approximately two.

5. A method for selecting a data rate in a modem based on a plurality of error signals, each error signal representing the difference between an output of an equalizer module and an output of a detector module, comprising the steps of:
   computing an average error value from the plurality of error signals;
   determining a signal to noise ratio using the average error value;
   incrementing the signal to noise ratio by a bonus amount, wherein the value of the bonus amount increases the signal to noise ratio to a projected final signal to noise ratio; and
   selecting the data rate based on the incremented signal to noise ratio.

6. A method as recited in claim 5, further comprising the step of:
   periodically decrementing the signal to noise ratio over a time period until the bonus amount has been removed.

7. A method for selecting a data rate in a modem based on a plurality of error signals, each error signal representing the difference between an output of an equalizer module and an output of a detector module, comprising the steps of:
   computing an average error value from the plurality of error signals;
   determining a signal to noise ratio using the average error value;
   adjusting the signal to noise ratio by a penalty amount, wherein the penalty amount is related to a number of incorrect symbols detected by the detector module; and
   selecting the data rate based on the adjusted signal to noise ratio.

8. A method for selecting a data rate in a modem based on a plurality of error signals, each error signal representing the difference between an output of an equalizer module and an output of a detector module, comprising the steps of:
   computing an average error value from the plurality of error signals;
   determining a signal to noise ratio using the average error value;
   adjusting the signal to noise ratio by a penalty amount, wherein the penalty amount is set through an attention code command; and
   selecting the data rate based on the adjusted signal to noise ratio.

9. A method for selecting a data rate in a modem based on a plurality of error signals, each error signal representing the difference between an output of an equalizer module and an output of a detector module, comprising the steps of:
   computing an average error value from the plurality of error signals;
   determining a signal to noise ratio using the average error value;
   selecting the data rate based on the signal to noise ratio;
   wherein the selecting step comprises the step of choosing the data rate from a table uniquely associating signal to noise ratio values with data rate values;
   evaluating a frequency response of a communication channel;
   eliminating the computing, determining, and selecting steps if the evaluation of the frequency response indicates the communication channel is incapable of supporting data transmission at all but a lowest data rate value stored in the table; and
   setting the data rate to a minimum data rate that is not greater than the lowest data rate value stored in the table if the evaluation of the frequency response indicates the communication channel is incapable of supporting data transmission at all but the lowest data rate value stored in the table.

10. A modem having a data rate selection capability based on a plurality of error signals, each error signal representing the difference between an output of an equalizer module and an output of a detector module, comprising:
    a module which computes an average error value from the plurality of error signals;
    a module which determines a signal to noise ratio using the average error value;
    a module which selects the data rate based on the signal to noise ratio;
    a module which limits the average error value to a maximum threshold to generate a limited average error value; and
    a low pass filter for filtering the limited average error value to generate a filtered limited average error value, the module which determines being responsive to the filtered limited average error value.

11. A modem as recited in claim 10, further comprising:
    a module which multiplies the filtered limited average error value by a scaling factor.

12. A modem as recited in claim 11, wherein the maximum threshold is equal to the filtered limited average error value multiplied by the scaling factor.

13. A modem as recited in claim 12, wherein the scaling factor is approximately two.

14. A modem having a data rate selection capability based on a plurality of error signals, each error signal representing the difference between an output of an equalizer module and an output of a detector module, comprising:

a module which computes an average error value from the plurality of error signals;

a module which determines a signal to noise ratio using the average error value;

a module which increments the signal to noise ratio by a bonus amount, wherein the value of the bonus amount increases the signal to noise ratio to a projected final signal to noise ratio; and a module which selects the data rate based on the incremented signal to noise ratio.

15. A modem as recited in claim 14, further comprising:

a module which periodically decrements the signal to noise ratio over a time period until the bonus amount has been removed.

16. A modem having a data rate selection capability based on a plurality of error signals, each error signal representing the difference between an output of an equalizer module and an output of a detector module, comprising:

a module which computes an average error value from the plurality of error signals;

a module which determines a signal to noise ratio using the average error value;

a module which adjusts the signal to noise ratio by a penalty amount, wherein the penalty amount is related to a number of incorrect symbols detected by the detector module; and a module which selects the data rate based on the adjusted signal to noise ratio.

17. A modem having a data rate selection capability based on a plurality of error signals, each error signal representing the difference between an output of an equalizer module and an output of a detector module, comprising:

a module which computes an average error value from the plurality of error signals;

a module which determines a signal to noise ratio using the average error value;

a module which adjusts the signal to noise ratio by a penalty amount wherein the penalty amount is set through an attention code command; and a module which selects the data rate base on the adjusted signal to noise ratio.

18. A modem having a data rate selection capability based on a plurality of error signals, each error signal representing the difference between an output of an equalizer module and an output of a detector module, comprising:

a module which computes an average error value from the plurality of error signals;

a module which determines a signal to noise ratio using the average error value;

a module which selects the data rate based on the signal to noise ratio;

wherein the module which selects comprises a module which chooses the data rate from a table uniquely associating signal to noise ratio values with data rate values;

a module which evaluates a frequency response of a communication channel; and a module which sets the data rate to a minimum data rate that is not greater than the lowest data rate stored in the table, the module which sets being responsive to the module which evaluates.

19. A computer program product for selecting a data rate in a modem based on a plurality of error signals, each error signal representing the difference between an output of an equalizer module and an output of a detector module, comprising:

a computer readable storage medium having computer readable program code embodied therein, the computer readable code comprising:

logic configured to compute an average error value from the plurality of error signals;

logic configured to determine a signal to noise ratio using the average error value;

logic configured to select the data rate based on the signal to noise ratio;

logic configured to limit the average error value to a maximum threshold to generate a limited average error value; and logic configured to low pass filter the limited average error value to generate a filtered limited average error value, the logic configured to determine being responsive to the filtered limited average error value.

20. A computer program product as recited in claim 19, further comprising:

logic configured to multiply the filtered limited average error value by a scaling factor.

21. A computer program product as recited in claim 20, wherein the maximum threshold is equal to the filtered limited average error value multiplied by the scaling factor.

22. A computer program product as recited in claim 21, wherein the scaling factor is approximately two.

23. A computer program product for selecting a data rate in a modem based on a plurality of error signals, each error signal representing the difference between an output of an equalizer module and an output of a detector module, comprising:

a computer readable storage medium having computer readable program code embodied therein, the computer readable code comprising:

logic configured to compute an average error value from the plurality of error signals;

logic configured to determine a signal to noise ratio using the average error value;

logic configured to increment the signal to noise ratio by a bonus amount, wherein the value of the bonus amount increases the signal to noise ratio to a projected final signal to noise ratio; and logic configured to select the data rate based on the incremented signal to noise ratio.

24. A computer program product as recited in claim 23, further comprising:

logic configured to periodically decrement the signal to noise ratio over a time period until the bonus amount has been removed.

25. A computer program product for selecting a data rate in a modem based on a plurality of error signals, each error signal representing the difference between an output of an equalizer module and an output of a detector module, comprising:

a computer readable storage medium having computer readable program code embodied therein, the computer readable code comprising:

logic configured to compute an average error value from the plurality of error signals;

logic configured to determine a signal to noise ratio using the average error value;

logic configured to adjust the signal to noise ratio by a penalty amount, wherein the penalty amount is related to a number of incorrect symbols detected by the detector module; and logic configured to select the data rate based on the adjusted signal to noise ratio.

26. A computer program product for selecting a data rate in a modem based on a plurality of error signals, each error signal representing the difference between an output of an equalizer module and an output of a detector module, comprising:

a computer readable storage medium having computer readable program code embodied therein, the computer readable code comprising:

logic configured to compute an average error value from the plurality of error signals;

logic configured to determine a signal to noise ratio using the average error value;

logic configured to adjust the signal to noise ratio by a penalty amount, wherein the penalty amount is set through an attention code command; and logic configured to select the data rate based on the adjusted signal to noise ratio.

27. A computer program product for selecting a data rate in a modem based on a plurality of error signals, each error signal representing the difference between an output of an equalizer module and an output of a detector module, comprising:

a computer readable storage medium having computer readable program code embodied therein, the computer readable code comprising:

logic configured to compute an average error value from the plurality of error signals;

logic configured to determine a signal to noise ratio using the average error value;

logic configured to select the data rate based on the signal to noise ratio;

wherein the logic configured to select comprises logic configured to choose the data rate from a table uniquely associating signal to noise ratio values with data rate values;

logic configured to evaluate a frequency response of a communication channel; and logic configured to set, responsive to the logic configured to evaluate, the data rate to a minimum data rate that is not greater than the lowest data rate stored in the table.

* * * * *